(12) United States Patent
Parra

(10) Patent No.: US 11,025,581 B2
(45) Date of Patent: *Jun. 1, 2021

(54) SYSTEM AND METHOD FOR LOCATION AND TIME BASED SOCIAL NETWORKING

(71) Applicant: TU ORBIT INC., Hillsdale, NJ (US)

(72) Inventor: Henry Parra, Hillsdale, NJ (US)

(73) Assignee: TU ORBIT INC., Hillsdale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,147

(22) Filed: Aug. 1, 2018

(65) Prior Publication Data

US 2018/0343225 A1 Nov. 29, 2018

Related U.S. Application Data

(63) Continuation of application No. 14/723,201, filed on May 27, 2015, now Pat. No. 10,075,406, which is a continuation-in-part of application No. 14/057,915, filed on Oct. 18, 2013, now Pat. No. 9,769,224.

(60) Provisional application No. 61/715,621, filed on Oct. 18, 2012.

(51) Int. Cl.
| | |
|---|---|
| *G06F 3/048* | (2013.01) |
| *H04L 12/58* | (2006.01) |
| *H04L 29/08* | (2006.01) |
| *H04L 29/06* | (2006.01) |

(52) U.S. Cl.
CPC .............. *H04L 51/32* (2013.01); *G06F 3/048* (2013.01); *H04L 67/02* (2013.01); *H04L 67/18* (2013.01); *H04L 67/306* (2013.01); *H04L 69/28* (2013.01)

(58) Field of Classification Search
CPC ......... G06F 3/048; H04L 51/32; H04L 67/02; H04L 67/18; H04L 67/306; H04L 69/28
See application file for complete search history.

(56) References Cited

U.S. PATENT DOCUMENTS

| | | |
|---|---|---|
| 8,122,341 B1 | 2/2012 | Dayan |
| 8,151,358 B1 | 4/2012 | Herold |
| 8,862,995 B1 | 10/2014 | Kuhne |
| 9,552,334 B1 | 1/2017 | Meisels |
| 2007/0255643 A1 | 11/2007 | Capuano |
| 2008/0098302 A1* | 4/2008 | Roose .................. G06F 17/273 715/257 |
| 2008/0172288 A1* | 7/2008 | Pilskalns ............... G06Q 30/02 705/14.23 |
| 2009/0300163 A1 | 12/2009 | Holm |
| 2012/0131645 A1 | 5/2012 | Harm |
| 2013/0016103 A1 | 1/2013 | Gossweiler, III |
| 2013/0104035 A1* | 4/2013 | Wagner ................. H04W 4/029 715/240 |

(Continued)

*Primary Examiner* — Xuyang Xia
(74) *Attorney, Agent, or Firm* — Robert E. Colletti; Haug Partners LLP

(57) ABSTRACT

The present application is directed to a system and method for creating on-line comments of a point of interest. The system and method creates a moment having a piece of digital content showing the point of interest, wherein the moment has a time stamp and a location stamp; and shares the moment with a predetermined group of members. The sharing of the moment is limited to members that meet the time stamp and the location stamp, and the system and method refuse accepting comments from members that do not meet the time stamp and location stamp.

16 Claims, 21 Drawing Sheets

(56) References Cited

U.S. PATENT DOCUMENTS

| | | | |
|---|---|---|---|
| 2013/0117692 A1* | 5/2013 | Padmanabhan | H04N 21/4126 715/753 |
| 2013/0174275 A1 | 7/2013 | Micucci | |
| 2013/0185285 A1 | 7/2013 | Shuman | |
| 2013/0227471 A1 | 8/2013 | Cha | |
| 2013/0268594 A1 | 10/2013 | Kogut | |
| 2013/0326589 A1* | 12/2013 | Butler | G06Q 30/0267 726/4 |
| 2013/0339868 A1* | 12/2013 | Sharpe | G06Q 10/10 715/739 |
| 2014/0026088 A1* | 1/2014 | Monte | G06F 3/04855 715/765 |
| 2014/0164979 A1* | 6/2014 | Deeter | G06F 3/048 715/774 |

* cited by examiner

- Show My Moments
- Show Friends Moments  930
- Show Family Moments

Show moments after:

1/30/2013

932 Show moments before:

1/30/2013

Tags:
934

Handles:
936

SYSTEM AND METHOD FOR LOCATION AND TIME BASED SOCIAL NETWORKING

RELATED APPLICATIONS

The present application is a continuation of U.S. application Ser. No. 14/723,201 filed on May 27, 2015 to Henry Parra, titled "System and Method for Location and Time Based Social Networking," which is a continuation in part of U.S. application Ser. No. 14/057,915 filed on Oct. 18, 2013 to Henry Parra, titled "Social Networking System and Method," now U.S. Pat. No. 9,769,224 issued Sep. 19, 2017, which claims benefits to U.S. Provisional Application No. 61/715,621 filed on Oct. 18, 2012, the entireties of which are herein incorporated by reference.

FIELD OF THE INVENTION

The present application generally relates to a system and method for social networking based on location and time.

BACKGROUND

Current social networks do not adequately protect user's identity and do not provide a hub for connecting with people based on time and location. Additionally, users are not able to connect to other social networks using one single social network. Current social networks are cluttered and are not dynamic enough to meet a user's personal needs. Further, the members of the social network cannot sort through uploaded files of other users by time, date, and location. Thus, there is a need for an improved social networking site that allows people to connect with others based on time and location posts.

SUMMARY OF THE INVENTION

The present application relates to a social networking system and method that allow individuals to create, store, aggregate, search and/or share content, such as "moments," based on time and location. The content can remain private or be made public in real-time, depending on the discretion of the user. Users also have the ability to connect with others who currently share, have shared, or will share contents that are in the location and time interval. To protect the privacy of the user, a moment is not re-shared without permission of the user, allowing the creator of the moment to maintain control of each moment and to determine and maintain the desired level of privacy or sharing for each moment.

In one aspect of the present application, a system for social networking comprises: a computer having a user interface; and a program product comprising a machine-readable program code for causing, when executed, the computer to perform the following process steps: prompting a user to create a user account; prompting the user to input personal information; storing the personal information on a database; prompting the user to create a moment, wherein the moment comprises information comprising at least a time and a location of a place that the user is currently located, was located in the past, or will be located in the future; storing the moment on the database, wherein a plurality of moments submitted from third party users are saved; receiving an entered search criteria to request viewing at least one moment within the database; and displaying at least one moment based on the inputted search criteria.

In another aspect of the present application, a system for social networking comprises: a computer having a user interface; and a program product comprising a machine-readable program code for causing, when executed, the computer to perform the following process steps: prompting a user to create a user account; prompting the user to input personal information; storing the personal information on a database; uploading a time and a location of the user to the database, wherein the database comprises the time and location of third party users; searching for third party users having a similar time and location as the uploaded time and location of the user; and giving the user the ability to connect/socialize with the third party users that have a similar time and location to the user. Additionally users have the ability to create moments and place them in the public domain in the map tab for all users to view them.

According to an aspect, the present application is directed to a method for creating on-line comments of a point of interest. The method comprises creating a moment having a piece of digital content showing the point of interest, wherein the moment has a time stamp and a location stamp; and sharing the moment with a predetermined group of members. The sharing of the moment is limited to members that meet the time stamp and the location stamp, and the method refuses accepting comments from members that do not meet the time stamp and location stamp.

According to an embodiment, the moment has an attribute that controls the re-sharing of the moment.

According to another embodiment, the attribute prevents the moment from being re-shared.

According to yet another embodiment, the method comprises assigning a unique handle to each moment. The handle obfuscates the real identity of the creator of the moment.

According to various embodiments, the location stamp is created based on GPS data of a device that creates the moment, represents a property line boundary, or is created based on input of the creator of the moment, which includes a user-drawn polygon on a map.

According to yet another embodiment, the time stamp represents a past time or a future time.

According to yet another embodiment, the method records a location stamp of a moment that is liked by a user and reminds the user about a place associated with the recorded location stamp when the user is within the proximity of the place.

According to various embodiments, the method creates a report of an emergency incident based on comments of a moment created for the emergency incident, a report of a criminal activity based on comments of a moment created for the criminal activity, a report of a lost item based on comments of a moment created for the lost item, a report of maintenance work of a public road based on comments of a moment created for the public road, or a report of a public transit route based on comments of a moment created for the public transit route.

According to another aspect, the present application is directed to a non-transitory recording medium storing an executable program which, when executed, causes a processor to execute a method for creating on-line comments of a point of interest as set forth in the present application

BRIEF DESCRIPTION OF THE DRAWINGS

The accompanying drawings are provided to illustrate embodiments of this disclosure, and, together with the detailed description, serve to explain principles of embodiments as set forth in the present application, in which.

DETAILED DESCRIPTION

It will be appreciated by those ordinarily skilled in the art that the foregoing brief description and the following detailed description are exemplary (i.e., illustrative) and explanatory of the subject matter as set forth in the present application, but are not intended to be restrictive thereof or limiting of the advantages that can be achieved by the present application in various implementations. Additionally, it is understood that the foregoing summary and ensuing detailed description are representative of some embodiments as set forth in the present application, and are neither representative nor inclusive of all subject matter and embodiments within the scope as set forth in the present application.

The present application may include a Social Ecosystem that allows users to communicate in anonymity, and store and publish personal location based data. In certain embodiments, the user may create a handle and submit an avatar picture in order to connect with other network users that a user does not know. The users may invite and connect with other users that uploaded information corresponding to a same time, place, and date. In certain embodiments, the user may be able to connect to other social networks. In certain embodiments, the website may include a layout comprising digital notepads and interchangeable tabs that may allow the user to separate different aspects of their life. A network user may be able to view other network user's uploads by location, type of activity, date range, time range and a unique user.

The present application may include a social network that may store the user's location, date, and time data. The data stored may be used to connect users to other users who shared the same or very similar location, date, and time period (to be specified by the network). The present invention may further provide users with an outlet to organize data that third party network users have uploaded in a public folder and gives third party users the ability to view the uploaded information by user, date range, time range, and location.

The present application may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

Figure 1:
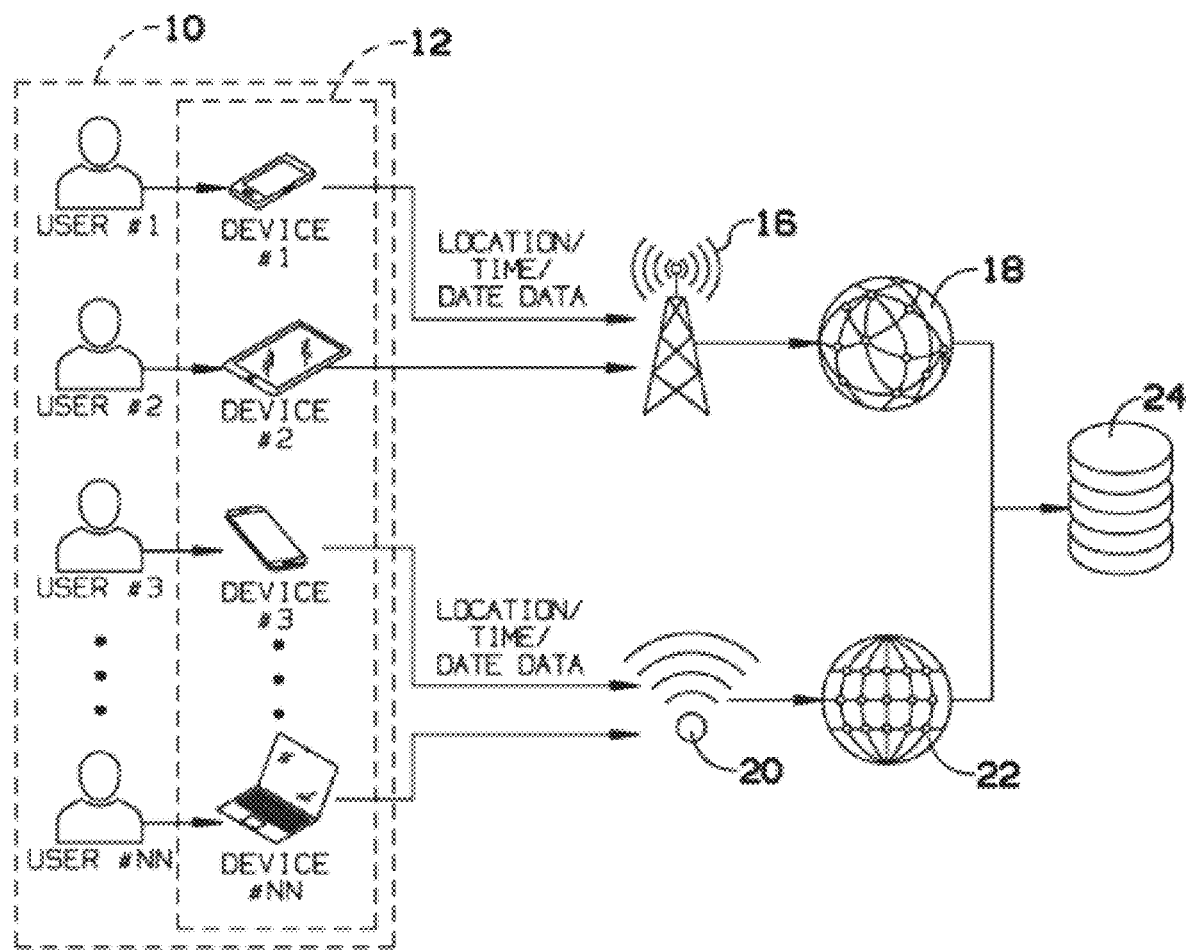
FIG. 1 illustrates a social networking system according to an embodiment of the present application.
Figure 2:
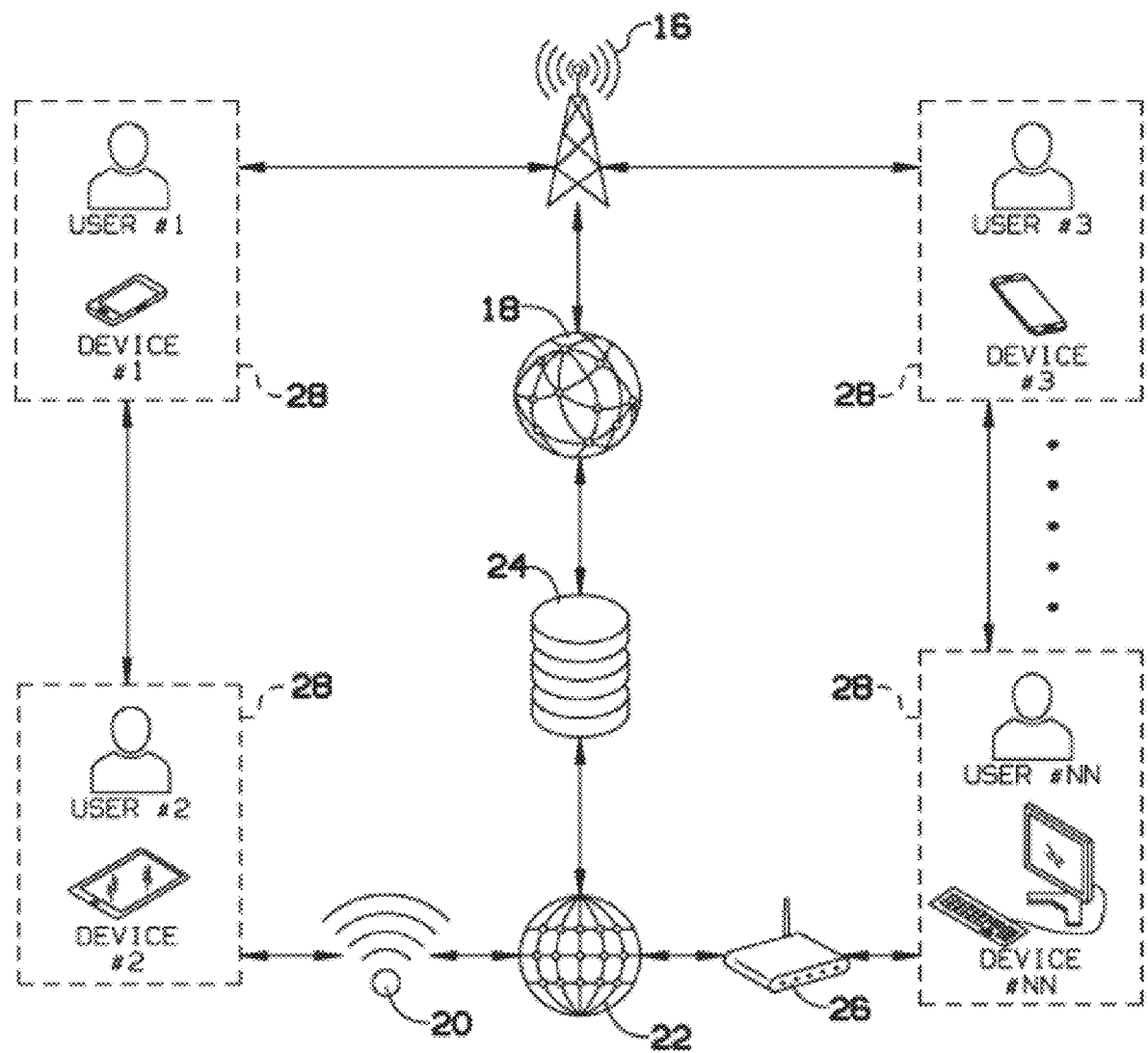
FIG. 2 illustrates a social networking system according to an embodiment of the present application.
Figure 3:
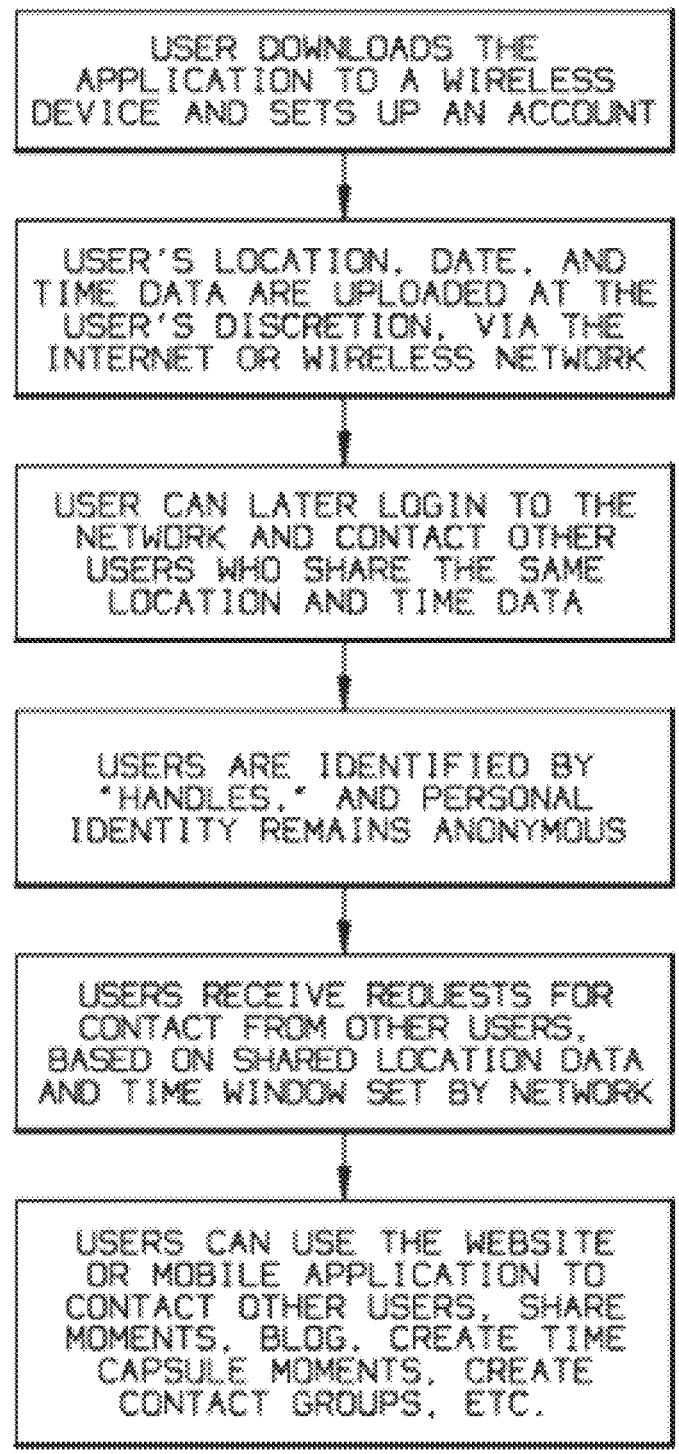
FIG. 3 illustrates a social networking method according to an embodiment of the present application.

Referring to the FIGS. 1 through 3, the present application may include a plurality of users 10 within the same location using computers 12, such as smart devices, to create an account and login. The computers 12 may either connect to 10 a wireless network 18 via a wireless tower 16 or may connect to the internet 22 using a hard-line or a Wi-Fi hot spot 20. Both of the wireless network 18 and the internet 22 may access a database 24 in which the information uploaded from the computer 12 may be stored. According to an embodiment, the Internet 22 and the wireless network 18 may be of any communication network, which should be broadly construed to include any one or more of a number of types of networks that may be created between devices using an internet connection, a LAN/WAN connection, a telephone connection, a wireless connection, a short message system (SMS), a satellite connection, and so forth. According to an embodiment, the communication network includes at least a cellular network, a satellite network, and a computer network, such as the Internet. The computer network may comprise various configurations and protocols including the internet, World Wide Web, intranets, virtual private networks, wide area networks, local networks, private networks using communication protocols proprietary to one or more companies, Ethernet, WiFi and HTTP, cloud and cloud based services, and various combinations of the foregoing. Such communication may be facilitated by any device capable of transmitting data to and from other computers, such as modems (e.g., dial-up, cable or fiber optic) and wireless interfaces.

Using the computer 12 connected to the database 24, the user may create the user account on the social networking website. In certain embodiments, the user may then input information. The information may include personal information such as a name, an age, a sex, a plurality of physical traits, and a plurality of personal interests. The user may also upload a picture and/or an avatar that represents and is displayed as their profile. The account and the personal information may be stored on the database 24. The location and time data of the user may be transferred to the database 24 and shared with other users 10 within the same location. The location and time data may not be shared with other users 28 that are not within the same time frame or not within the same location.

The social network of the present application may prompt a user to create a "moment". The moment of the present application may include at least a time and a location of a place that the user is currently located, was located in the past, or will be located in the future. The moment may be stored on the database 24. Multiple users 10 may create accounts and create a plurality of moments. All of the moments of the users 10 may be stored on the database. In certain embodiments, the present application may include a search box so that third party users may search for other third party user's moments. A user may enter in search criteria and may be presented with a plurality of moments based on the inputted search criteria.

As mentioned above, the moments of the present application may include at least a time and a location that the user has inputted. In certain embodiments, users may attach data to the moments. The data may include, but is not limited to, uploaded video, pictures, and text. For example, if a user creates a moment based on a place that the user is going, the user may take pictures at the particular place and upload the picture to the moment.

The website or application of the present invention may be setup using different tabs and screens. For example, the present invention may include a home screen. The home screen may display all of the updated information that has been inputted by the user. In certain embodiments, the home screen may include a notepad that displays all of the user's personal moments previously submitted. The moments may be listed in chronological order. In certain embodiments the moments may include icons indicating if there is text, video, or pictures attached to the moment. In certain embodiments, the home screen may further include a map with icons representing moments in the notepad. Therefore, the moments may be placed on the map based on the location of the moment.

In certain embodiments, the home page may provide the user with an icon to create a moment, such as a time capsule. When selected, the user may enter in the month day and year, or simply select now, representing the time of creation. The use may either point on a map or enter in an address. In certain embodiments, the computer may include global positioning system capabilities, in which the computer may automatically locate the where the user is at that point. The user may also be given the option to upload data such as video, pictures or text. Once the moment has been created, a user may determine whether they would like to share the moment with the public or share the moment privately. For example, the user may pick between friends, family, acquaintances and the like. The home page may also include the search box to search for third party user moments.

The present application may further include a blog option. The user may select blog from a particular moment. A search may be automatically performed based on the particular moment's time and location. The present application may then allow users to text third part user's that created moments with similar times and locations. Therefore, if a user lost an object at a sports game, the user may either create a new moment or select a moment already created that included the location and the time of the sports game. The user may then begin chatting with users that have moments that include the same sports game with the same time and location.

In certain embodiments, the present application may further include a share tab. The share tab may provide a notepad of moments that other third part users have shared with the user. Therefore, a user may look at the shared moments to see where their friends are and what they are doing. The moments may be listed chronologically. Further, the user may select a certain day and time to see what users have done in the past or what users will be doing. The present application may further allow users to comment of third party moments, which may be saved to the moment. In certain embodiments, the shared moments may also be displayed on a map.

In certain embodiments, the present application may further include a public tab. The public tab may include a window that allows users to view shared public moments of third parties. The public tab may further include a map displaying the locations of third party users that have created moments. The user is able to upload data through the wireless device application to the public folder for all users to see. The public data can be sorted by user, location, date, and time ranges. Additionally, the data can be sorted by data type. A symbol/point depicting a public moment on the map coincides with a moment listed in tabular format adjacent to the map. Advertisements may be shown as pop ups on the map that are based on the user's current location. If the user is viewing a map location that is near the user's location then local/national advertisement may be displayed. Otherwise, national advertisement may be displayed alone.

The present application may further include a tool to meet other people without disclosing the user's identity. For example, the user may identify the moment in time, date, and location (latitude and longitude or place specified by user) by time stamping the moment using the wireless device application or website. The application/website may then upload that information on to the database and tag information to the user's profile. If the user would like to connect with other users that have shared the same location, date, and similar time period, the user may log into present invention to connect to the network and input the information creating a moment that the user wants to socialize in. A search may be performed within the database to catch up other users that shared the location and time period criteria and notify the users that there is an anonymous user that wants to connect with them. Such embodiments may be used for past moments, present moments, or future moments. The present invention may also notify the user of other shared moments created by third party users that include the same or similar time, date, and location.

By capturing location, date, and time period and uploading to the network along with other information (i.e. pictures, video, etc.) via an application in the user's wireless device, the user begins the process of social networking by date, time, and location. The information may be uploaded in real time or at a later time based on the user's discretion. The data may be stored in the database to be used at a future time for connecting with other users based on their past/future moments. When the user chooses to socialize with other users who share the specified location, date, and time period, the user may log onto the social network. Once logged in to the network, there may be a window where the user may input the search criteria and the application may run an algorithm that matches all three criteria with a variation in the time window that will be set by the network or set by the user and the network will connect you with the users that match the criteria. This may be done with complete discretion.

The present application may include many features that are dependent on the data being uploaded. A user can use the share tab feature to share moments and the time capsule feature can be used to upload past or future experiences not captured by a wireless device. There may also be a button feature that allows the user to socialize with other social networks. The share tab may allow the user to view other user's moments by location, date, and time and allows you to comment on that shared moment. Comments may be disabled by the user that is sharing the moment. In the public tab, a user may view what any user has uploaded and can search by location, handle, time, and date. The public tab may be independent of other tabs. Once you choose to upload to the public tab, the moment may be automatically updated to the home tab, such as the notepad. The blog tab may be a button feature usable at the home tab and is used to manage your created or received blogs.

Figure 4:
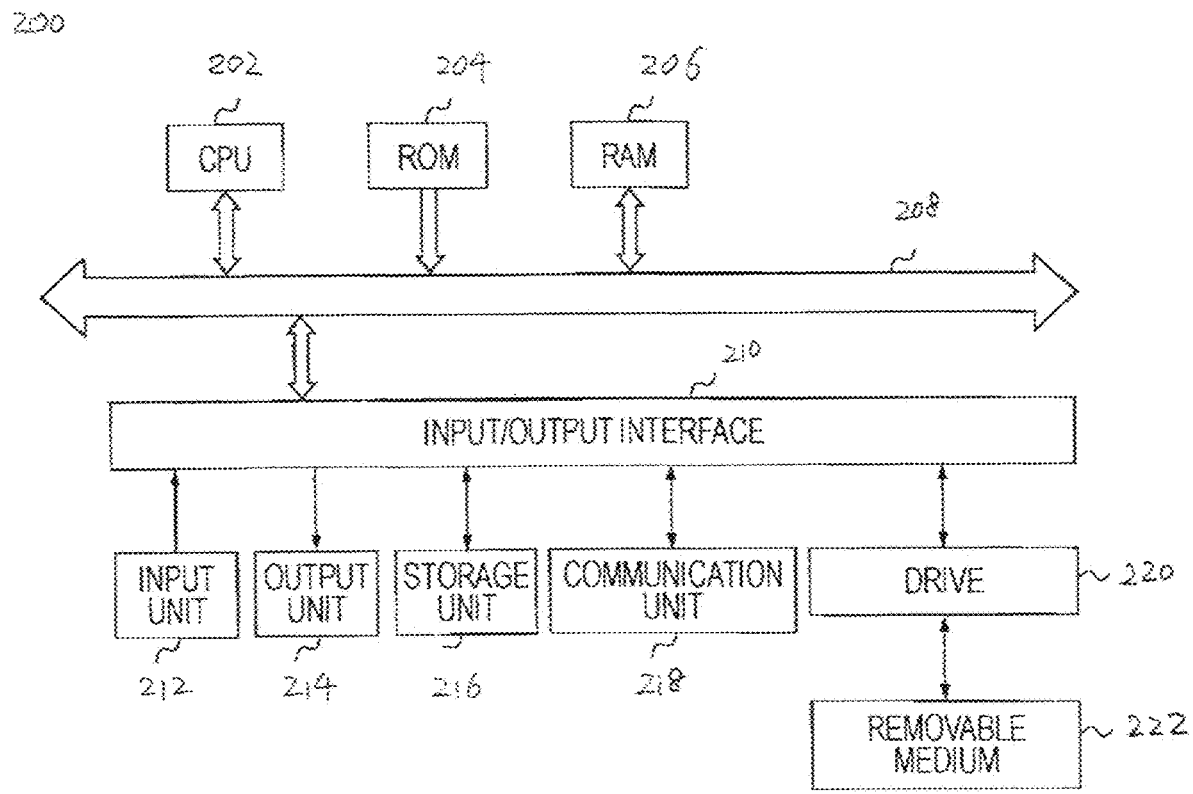
FIG. 4 illustrates an electronic device according to an embodiment of the present application.

FIG. 4 illustrates a general structure of the devices 1 to NN in FIGS. 1 and 2 according to an embodiment. The exemplary structure 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202 executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The CPU 202 may include multiple processors such as ASICs, FPGAs, GPUs, etc. A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by the user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the networks of FIG. 1.

A non-transitory storage medium 222, sometimes removable, may be formed of a magnetic disk, an optical disc, a magneto-optical disc, flash or EEPROM, SDSC (standard-capacity) card (SD card), or a semiconductor memory. The medium 222 is loaded as appropriate into the drive 220. The drive 220 reads data recorded on the medium 222 or records predetermined data on the removable medium 222.

An operating system such as Microsoft Windows 7®, Windows XP® or Vista™ Linux®, Mac OS®, or Unix® may be used by the device 200. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

According to an embodiment of the present application, the social networking system and method as disclosed in the present application may be implemented as hardware, software, or both. When the algorithm and process are implemented as software, such as an executable program, the algorithm and process are stored in the medium 222. The general structure as shown in FIG. 4 needs to be specifically configured to process the algorithm and process as disclosed in the present application. For example, the programs need to be installed in the device 200 and registered in the operation system. Thus, those individual instructions included in the programs transfer the exemplary structure from a general computer to a special designed device to execute the algorithm and process as disclosed in the present application.

Figure 5:
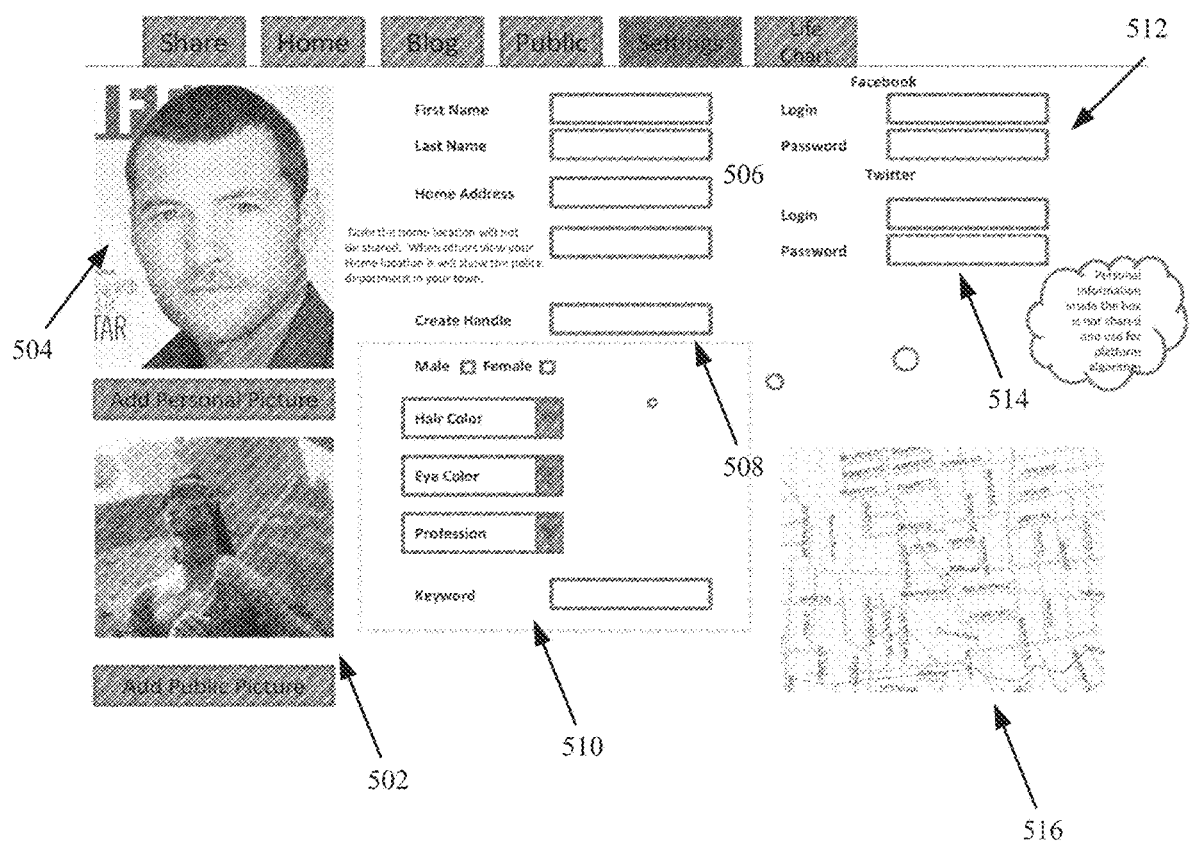
FIG. 5 illustrates functions for setting an account according to an embodiment of the present application.

FIG. 5 illustrates functions for setting up a user account according to an embodiment of the present application. Before creating a moment, a user may need to create a personal profile and store it in the present social networking system. A user may choose to use a fake picture 502 to represent himself or herself or choose to use a real picture 502 to represent himself or herself. The user may also store identification information 506, such as name and address, in the system. The personal profile may also include other personal information 510, such as gender, hair color, eye color, profession, or hobby. The identification information 506 and the other personal information 510 are not disclosed to other users of the system to protect privacy of the user. The user can also create a handle 508 that will be made available to the public. The handle 508 is used as an identification of any information published or shared by the user. The user may designate any information as the handle 508, including his or her real name or identity. When the user is a private individual, the user may create a handle that does not include the name. When the user is a public figure who wants to use the system to widely communicate with people who have a shared interest in a location and time, the user may be more likely to use his/her name in order to be easily identified, recognized and searched. According to an embodiment, a user may not be allowed to use his or her name as the handle at any time to enhance the privacy protection of the system. Furthermore, a user has the option to link his or her account in the present system with accounts of other social networking platforms such as Facebook or Twitter. A user may use the input fields 512 and 514 to link with other social networking platforms. A map 516 may be displayed during the period when the user inputs his or her personal information. On the map, the current location of the user may be displayed.

FIGS. 6A-6D illustrate various embodiments for creating a moment.

The term "moment" as used in the present application may be understood to represent a data point that has both a location attribute and a time attribute. The time attribute may represent a past, present and/or future date and time. The location attribute may represent a location, an address, an area on a map, a landmark, a city, an incident cite, coordinates, or GPS data. A moment also includes a topic of interest such as a photo, a video, a paragraph, a message, a post, a Tweet, a publication, a novel, and/or any form of digital media. The time and location attributes may be created by the system automatically or be created based on the user's input.

According to an embodiment, the location attribute may be created based on a GPS location, WIFI networks, E911 Meta data of a wireless system, or meta data of a picture or video. The location attribute may also be Geocoded onto a map. When GPS is accurate or signal available, the user may be prompted to input the location attribute to make the location as accurate as the user would like it to be. According to an embodiment, the user needs to edit the location to accommodate for past/present/future moments in order for the moment's to have a more precise location because the platform would not allow a user to communicate with other users based on location and time when a user is determined to be at a wrong location. For example, the system can recognize that the user is not at street level (sea level) and will ask the user to define a floor number.

The user can also include keywords/tags to describe a moment for reference. The tags represent user-defined words that reflect the user's experience at a particular time and location. A moment can be defined by the user as private that makes the moment sharable only for the individual user, semi-private that makes the moment shareable within the guidelines of the user, or public that makes the moment available for viewing throughout the universe of fellow system users. Private moments can be restricted to the individual user, or shared by the user at his or her discretion. A public moment can be accessed by anyone within the platform's universe. A public moment can have the user's name or handle identified, or be posted anonymously. Geocoding allows users to quickly and efficiently sort through stored moments based on location, user handle/user ID, user groups (including public), subject matter, date and time.

Figure 6A:
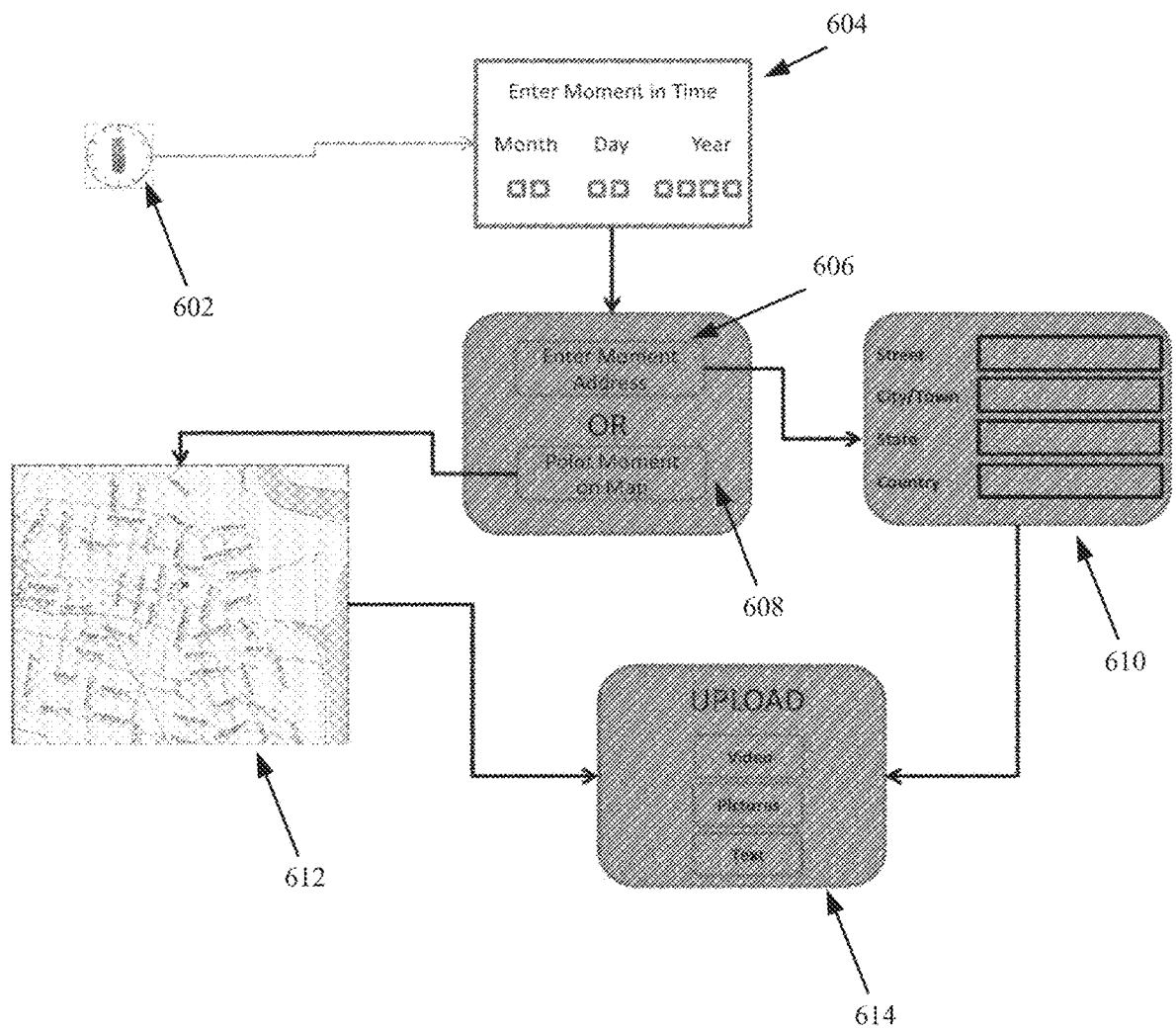
FIG. 6A illustrates functions for creating a moment according to an embodiment of the present application.

FIG. 6A illustrates an embodiment of creating a moment. A user uses a creating function 602 to execute the moment creating function. The creating function will require a user to input values for the time attribute 604. The time attribute 604 is used to limit the topic to a specific time period. According to an embodiment, the time attribute 604 may include information about year, month, day, and time. According to another embodiment, the time attribute may use other information to indicate a particular time period, such as 2008 World Cup or 2013 Super Bowl. The system also requires a location attribute 606 for a moment to be created. The location attribute 606 indicates a location of the moment. The location may be a geo-location or a virtual location such as an online address. The location attribute 606 may have a user input function 606 that allows a user to input location information 610 such as street, city, state or country. The location attribute 606 may also have a map function 608 that allows a user to specify the location on a map 612 by drawing a location on the map or by selecting a specific point on the map. After both the location attribute 606 and the time attribute 604 are input, the creating function provides a media function 614 that allows a user to select a particular content associated with the time and location attributes. The content may be a video file, a picture file, or a text. After a piece of content is selected, the content is uploaded to the present social networking system and stored in a database.

Figure 6B:
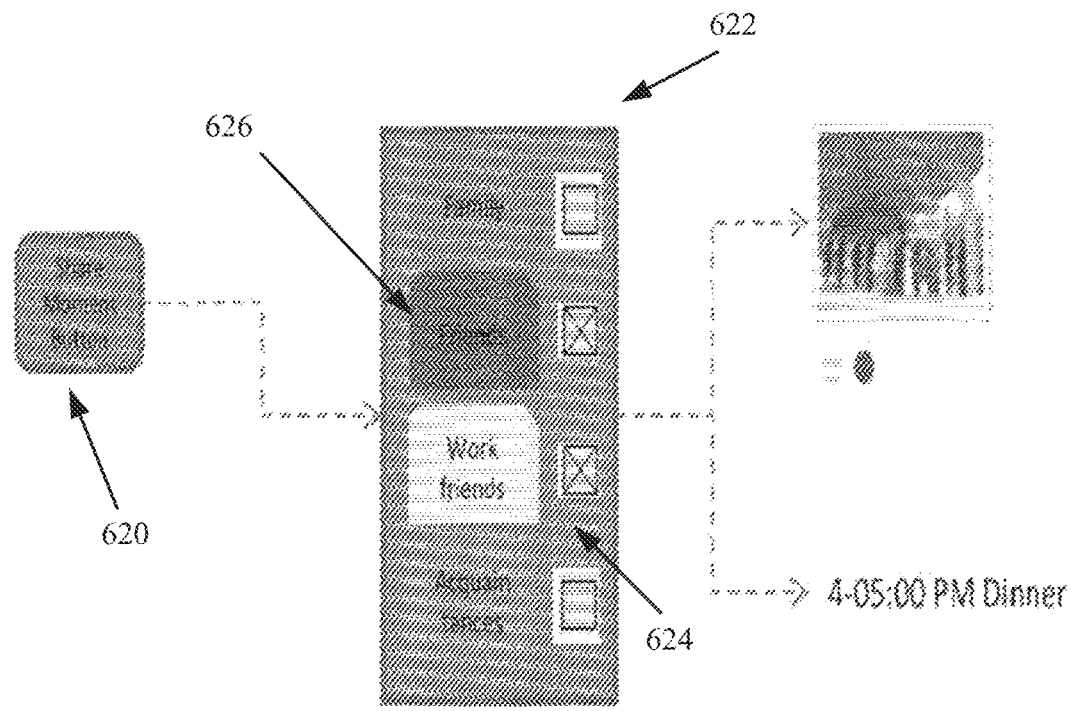
FIG. 6B illustrates functions for creating a moment according to an embodiment of the present application.

FIG. 6B illustrates another embodiment of creating a moment. After the content, the location attribute, and the time attribute are stored, a user may share the moment with other users. A share function 620 allows the user to share a moment with a plurality of groups 622. A user may assign contacts into different groups such as family, friends, work friends, or acquaintances. When sharing a moment, a user may choose one group, such as work friends 624, or two groups, such as friends 626. The user may also add description for a moment or add tags to the moment. When the moment is published, the handle as determined by the user is also assigned to that moment. Upon publication, members of the shared groups will receive a notification of the newly created moment. The notification may be provided via email, text message, phone calls, or a message in a user's online account.

Figure 6C:
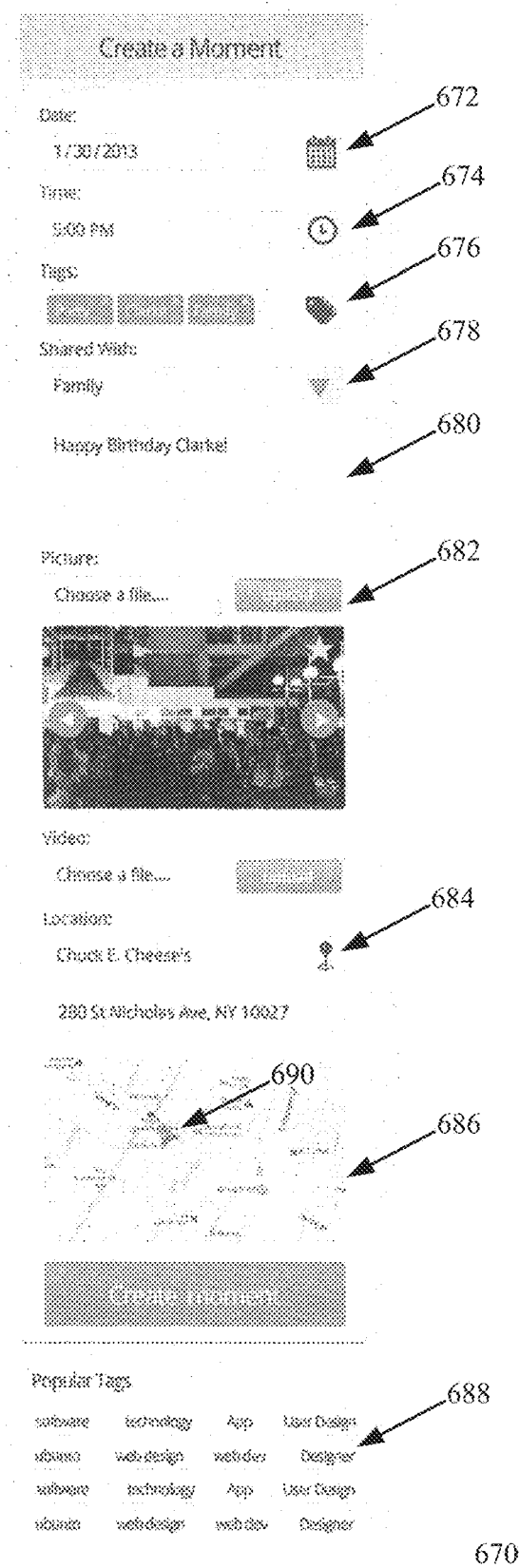
FIG. 6C illustrates functions for creating a moment according to an embodiment of the present application.

FIG. 6C illustrates another embodiment of creating a moment. The screenshot 670 represents a display on a tablet or a smart phone that embodies functions to create a moment. The screenshot 670 includes a plurality of operable buttons and a plurality of input fields to assist a user to create a moment. The button 672 is used to input a date or a range of dates. The button 674 is used to input a precise time point or a time period. The button 676 is used to create or assign tags or keywords to a moment. The input field 678 is used to select one or more groups for sharing the moment. One group includes a plurality of members designated by the user. The input field 680 is used to add descriptions for the moment. The button 682 is used to select a piece of content, such as a picture or a video, for sharing. The button 684 is used to input a location stamp of the moment by address or landmark or cross-section. The map 686 is used to display an icon 690 at a point that corresponds to the location input by the button 684. The position of the icon 690 on the map is updated in real time according to the input by the button 684. According to an embodiment, the map 686, when tapped by the user, is used to draw a location stamp by the user. The location stamp drawn by the user may be a point or a zone. The screenshot 670 may include a tag list area 688 that displays popular tags to the user.

Figure 6D:
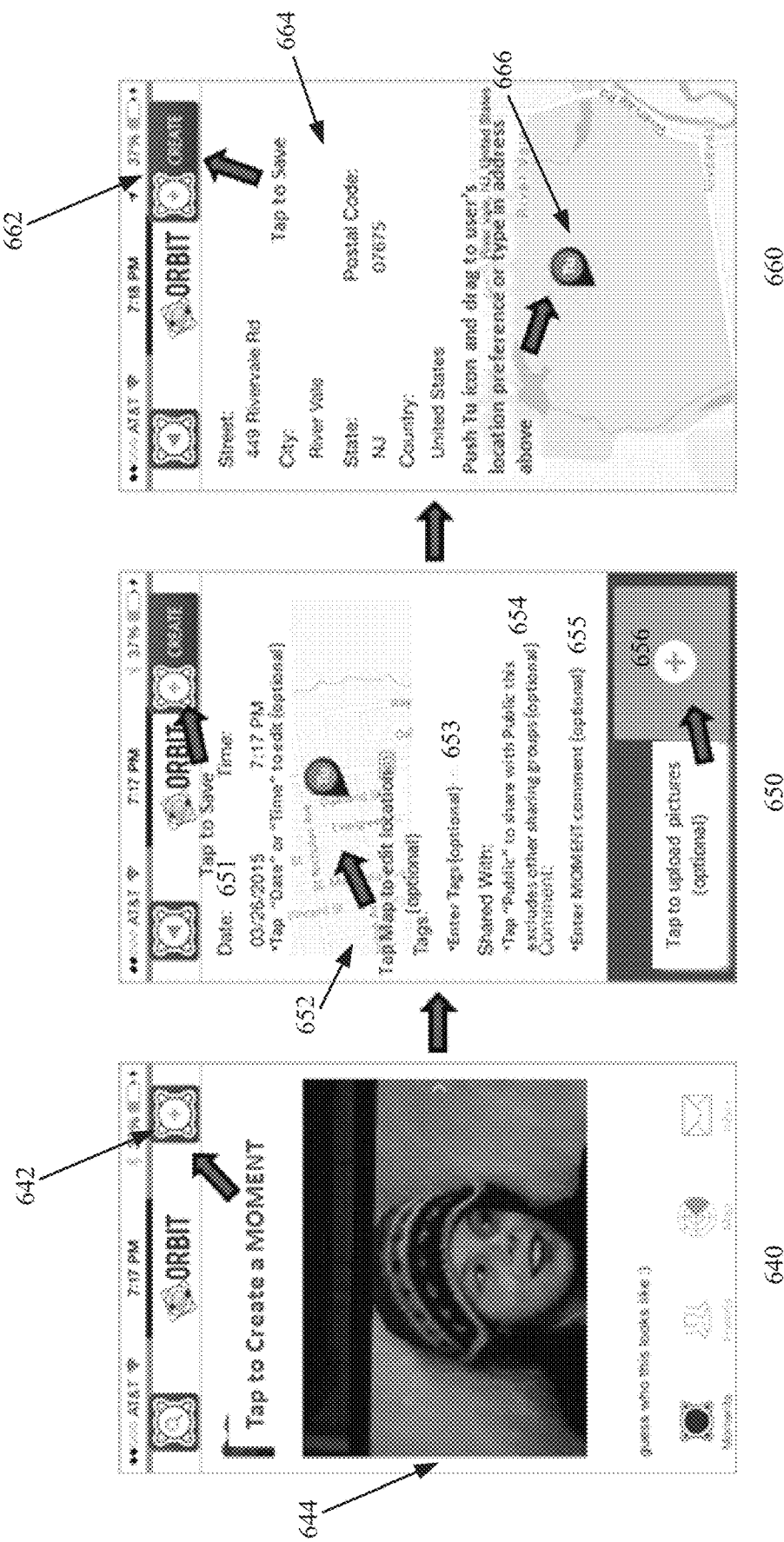
FIG. 6D illustrates functions for creating a moment according to an embodiment of the present application.

FIG. 6D illustrates an embodiment of creating a moment. As shown in FIG. 6D, creating a moment requires multiple screens 640, 650, and 660. On the screen 640, the icon 642 activates the creating function. When the icon 642 is tapped, a new screen 650 is presented to the user to input the time attribute 651, the location attribute 652, tags 653, shared groups 654, and comments about the moment 655. On the screen 650, the icon 656 allows a user to select and upload a piece of content, such as the picture 644, to the present system. When a user taps the location attribute 654, a new screen 660 is presented so that a user can input the location information 664 or draw the location on a map 666. The icon 662 or the icon 642 allows the user to share the moment after all the information is uploaded and stored.

According to an embodiment, the moment created by a user is kept private, by default. The user can share the moment publicly and/or with another user in its friend list, and/or any combination of all of the options. The user may also select a group of members that have been assigned by the user to share the moment. When a user shares with other friend groups, the moments are shared with one degree of separation. Only the intended audience can view the moment. In one embodiment, the friends of the users that the moment has been shared with are not allowed to view the moment. In another embodiment, when the moment is shared publicly, the sharing of the moment does not include any particular groups created by the user. The digital media posted for public view is designed to protect the identity of the user who shares the content. The identity of the user is concealed by not revealing its identity (user name), photo or personal info to other users. The handle assigned for each moment does not reveal the identity of the user. According to an embodiment, the system and method also allow the user to share the moment to other social media, such as Facebook.

Figure 7:
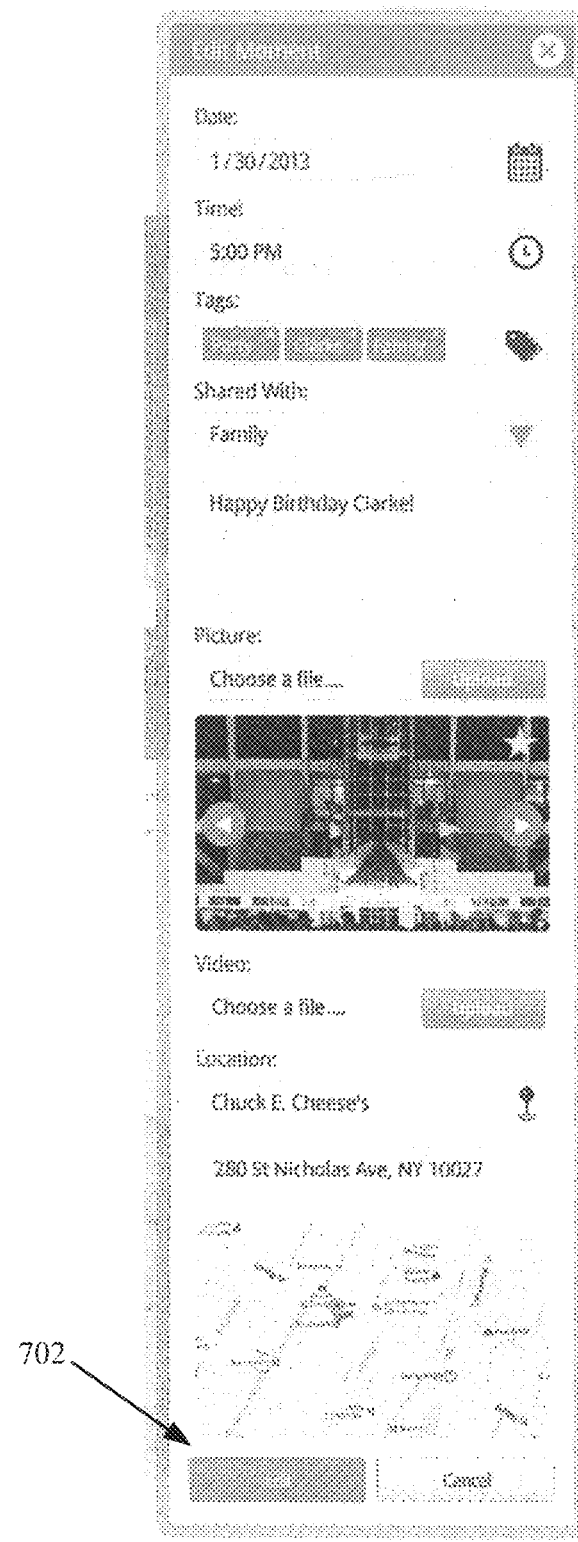
FIG. 7 illustrates functions for editing a moment according to an embodiment of the present application.

FIG. 7 illustrates functions for editing a moment according to an embodiment of the present application. The editing functions are similar as those used in FIG. 6C to create a moment. After the user finished revising the moment, the user can use the edit button 702 to store the changes. In general, the editing function allows the user to delete the moment, change time and date, change location, add/delete digital media, edit moment description text and change sharing properties (share with other groups and/or public, unshared with all groups and/or public, change sharing groups etc.).

Figure 8A:
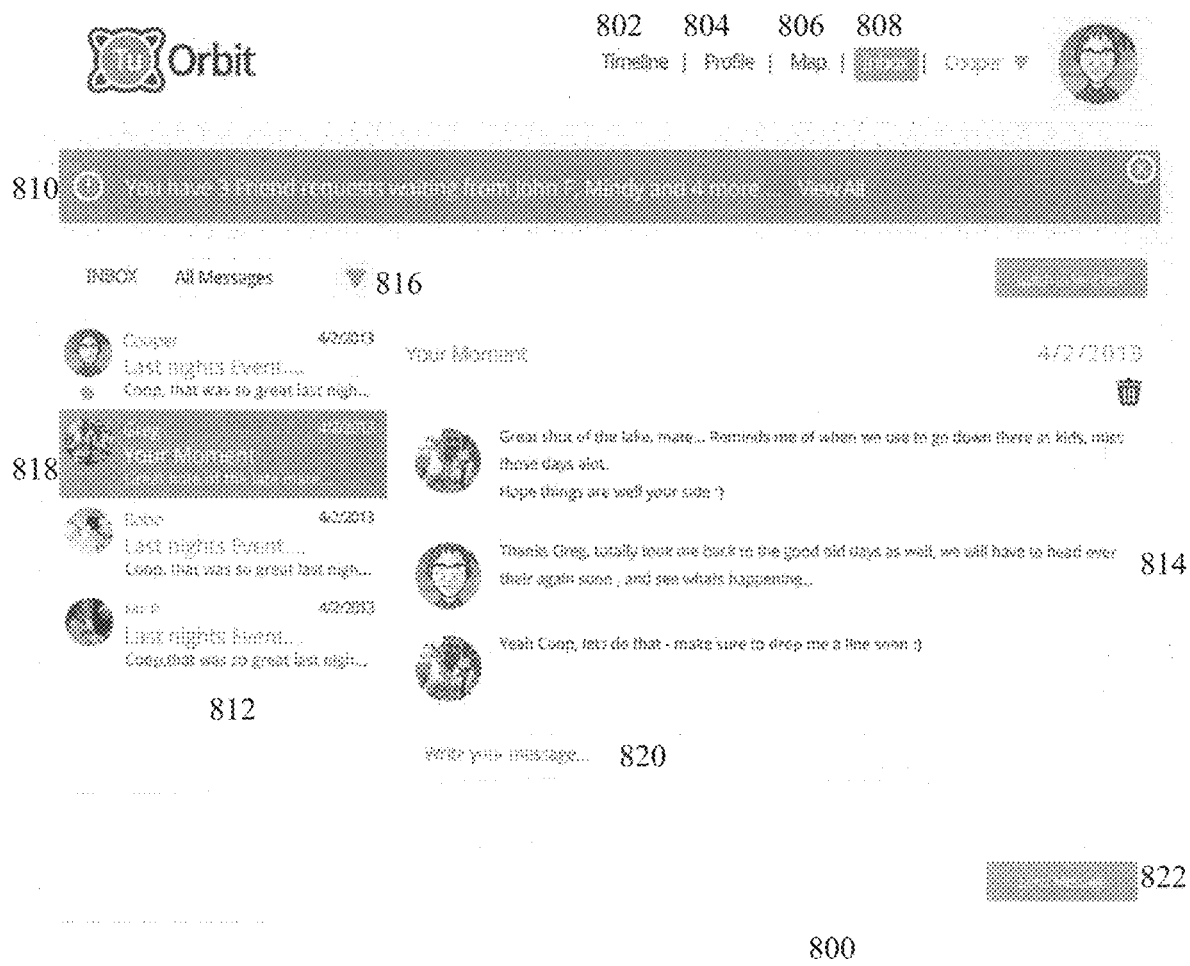
FIG. 8A illustrates a home screen according to an embodiment of the present application.

FIG. 8A illustrates a home screen according to an embodiment of the present application. The home screen 800 represents a dashboard to the user that summarizes the major functions of the present system available to the user. The home screen 800 includes a timeline button 802 that is used to review moments according to their time stamp, a profile button 804 that is used to view and edit personal information, a map button 806 that displays moments on a map, and an inbox button 808 that stores and displays all received messages. The banner 810 summarizes new messages received after the user's last log on time. The button 822 is used to switch from the inbox to a sent-box. The button 816 is used to filter messages according to user selected filtering parameters. The home screen 800 further displays a list of moments 812. If a user taps one moment 818, then the comments corresponding to that moment will be displays in the area 814. The home screen 800 also provides an input field 820 that is used to write a message, which can be sent to a designated recipient by using the send button 822.

Figure 8B:
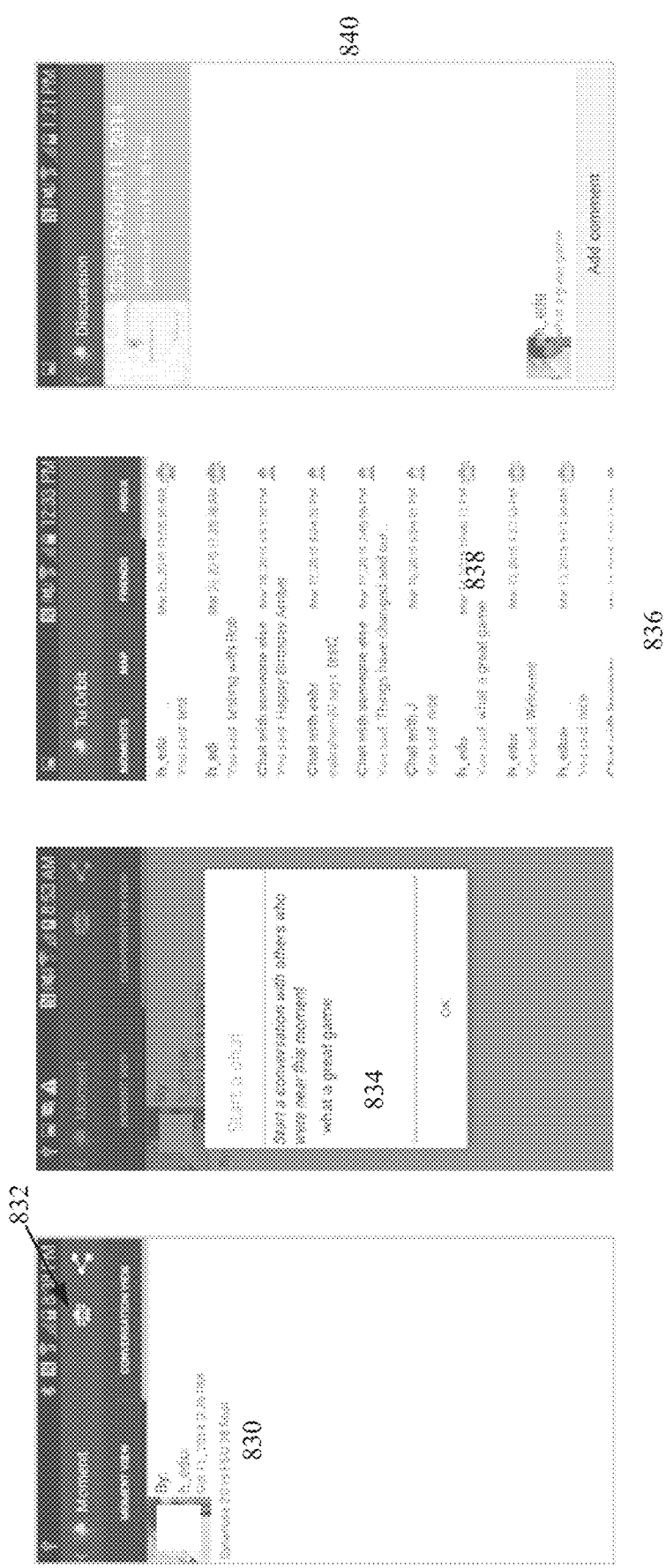
FIG. 8B illustrates functions for social networking with users who are near a moment according to an embodiment of the present application.

FIG. 8B illustrates functions for location and time based discussion according to an embodiment of the present application. A moment 830 is created with the time stamp as "Oct. 11, 2014 3:35 pm." It is noted that the time stamp is not necessary to be the current time stamp as shown on the device screen, which is "8:33 pm." The time stamp of this moment 830 represents a past time stamp because the game is finished. According to an embodiment, the time stamp of a moment may use a future time stamp. The location stamp of the moment 830 may be the present location of the device, which is represented by latitudes, longitudes, and attitudes obtained through the GPS data. The location stamp of the moment 830 may be the address of where the game was played, if the user prefers to limit the discussion with those audiences who were at the stadium. After the moment 830 is created, a conversation may be started by selecting the moment 830 and activating the conversation button 832. The present may present a message 834 to the user that reminds the user that the conversation will be limited to the specific location and the time. After the user confirms the location and time, the record is 838 is added to the list 836 showing all on-going conversations. If the user taps the record 838, the conversation screen 840 is displayed, which displays the location and time stamps of the moment and also the comments made to the moment.

Figure 9A:
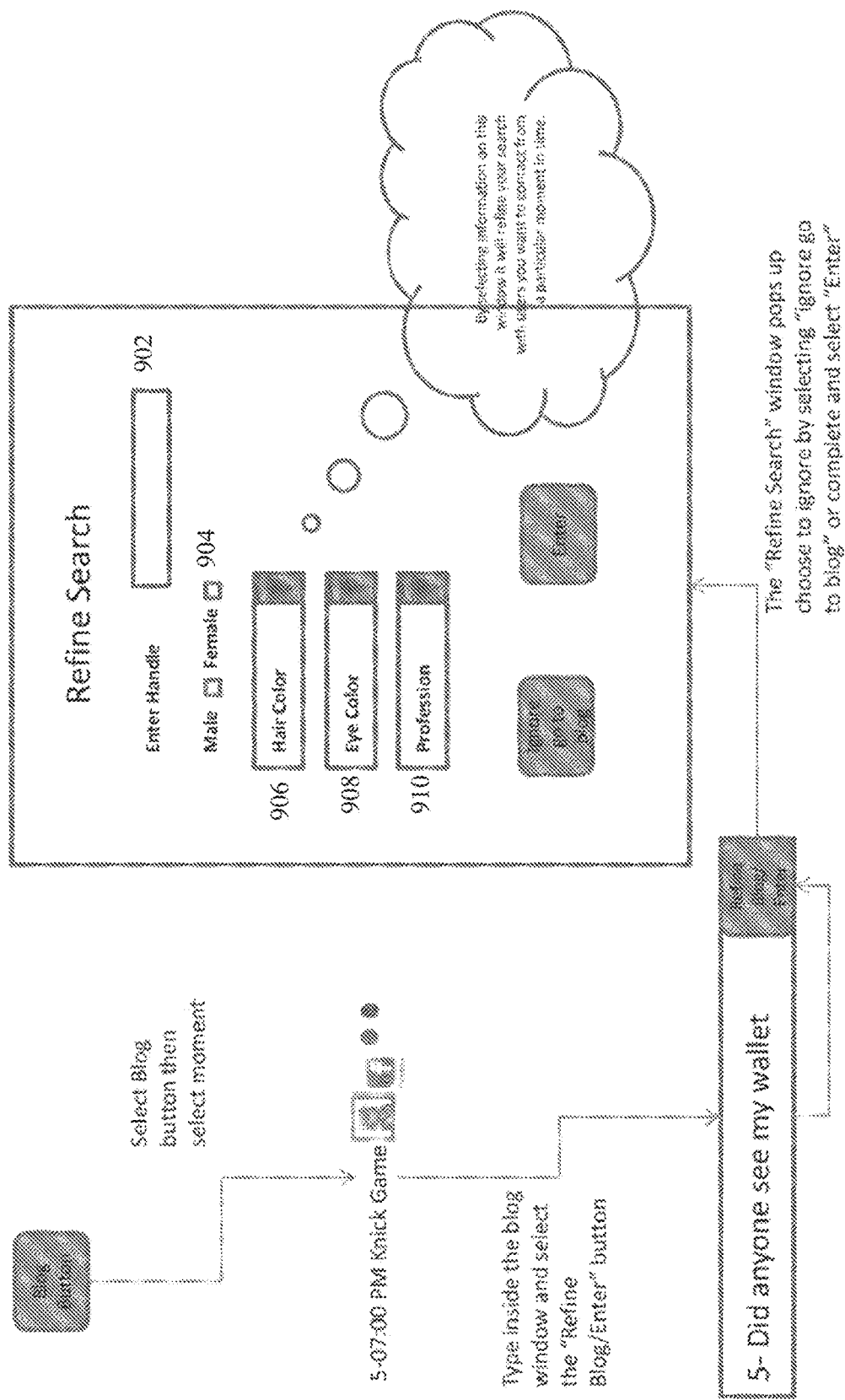
FIG. 9A illustrates a search function of moments according to an embodiment of the present application.
Figure 9B:
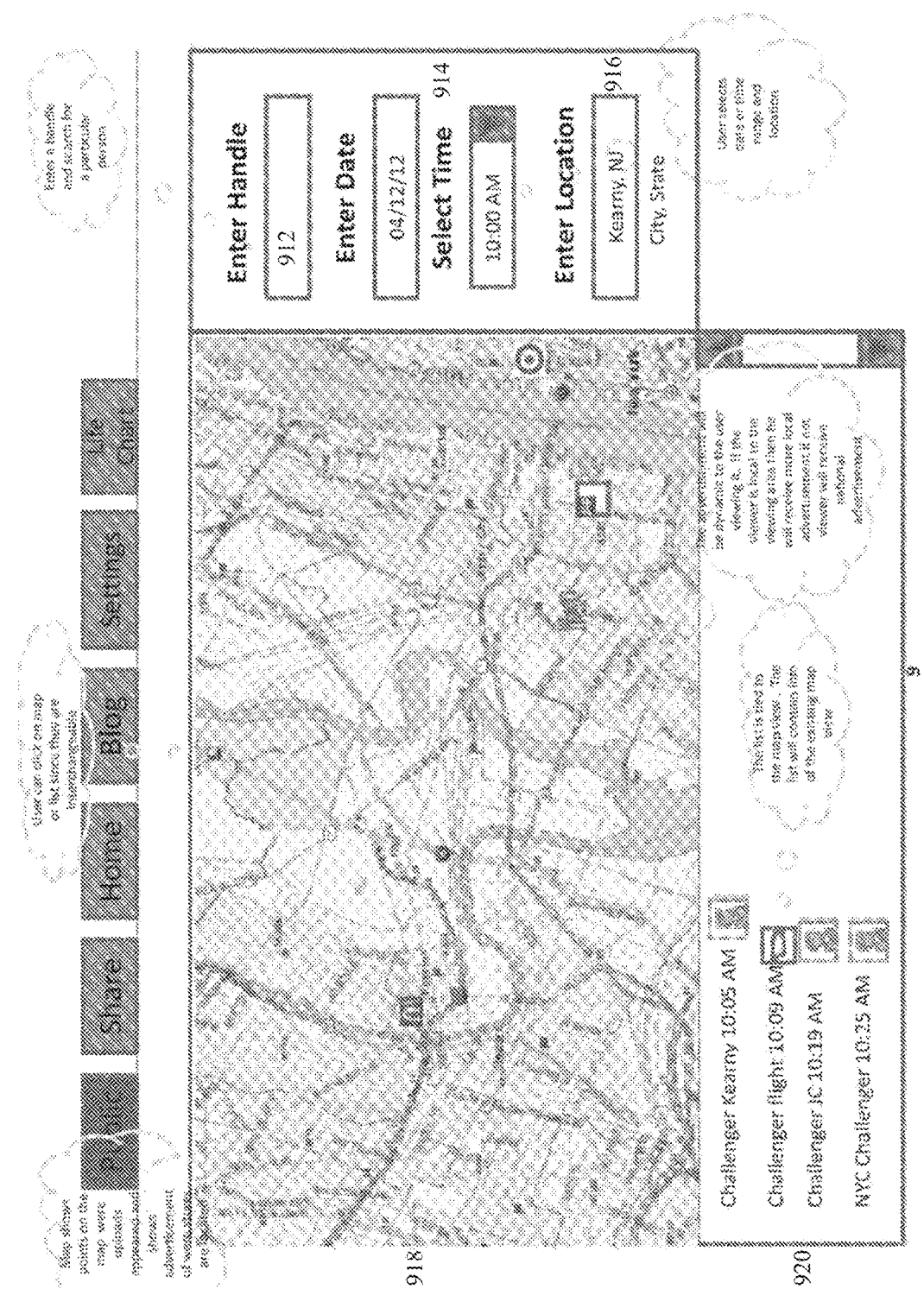
FIG. 9B illustrates a search function of moments according to an embodiment of the present application.

FIGS. 9A-E illustrates search functions for searching and/or filtering moments according to various embodiment of the present application. According to an embodiment, the present system and method allow a search of moments by handle 902, gender 940, hair color 906, eye color 908, and profession 910, as shown in FIG. 9A. According to another embodiment, the present system and method allow a search of moments by handle 902, a time attribute 914 that includes both date and time, and a location attribute 916, as shown in FIG. 9B. The search results are displayed in real time on a map 918. The search results are also listed in an area 920, as shown in FIG. 9B.

Figure 9C:
FIG. 9C illustrates a search function of moments according to an embodiment of the present application.
Figure 9C:
Figure 9C:
Figure 9C:
Figure 9C:
Figure 9C:
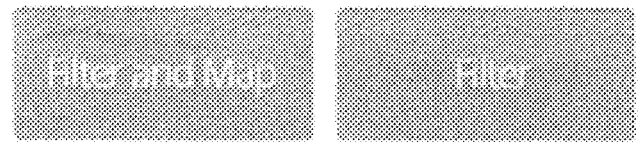

FIG. 9C shows another embodiment of searching or filtering moments. The filtering function includes a set of predetermined search criteria 930, a time attribute 932, tags 934, and handles 936. A user can conduct a search of moments by specifying parameters in each of the above-listed search factors.

Figure 9D:
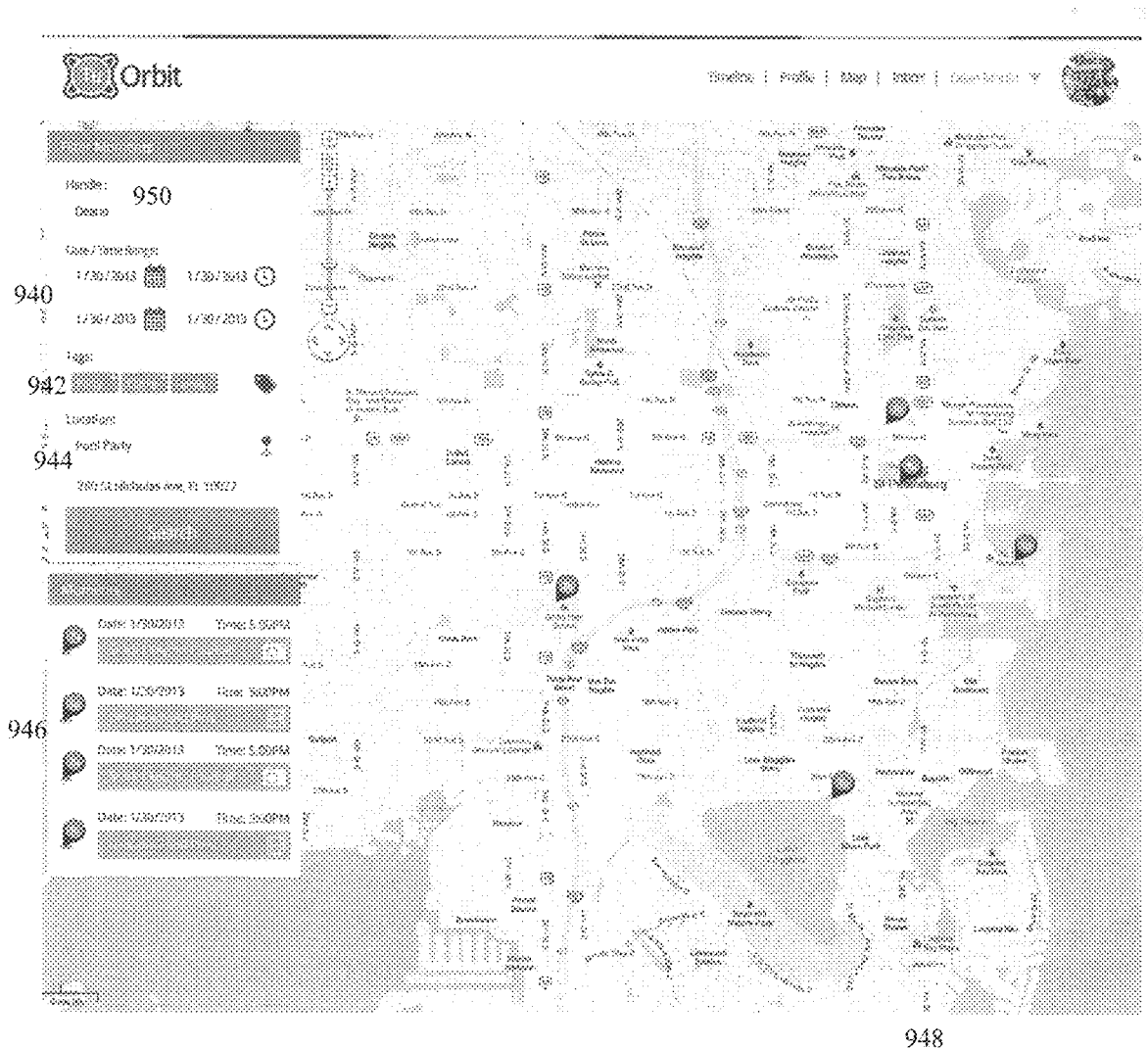
FIG. 9D illustrates a search function of moments according to an embodiment of the present application.

FIG. 9D illustrates another embodiment of filtering or searching moments. In this embodiment, the user can search moments based on handle 50, a time attribute 940, tags 942, and a location attribute 944 of a moment. The search results are listed in an area 946 and on a map 948. The location attribute 944 may also be input by drawing a region on the map 948. In one embodiment, the time and location information associated with a moment that has been designated as favorites or frequently visited by a user are used to dynamically filter moments to be displayed to the user. In another embodiment, the time and location information associated with a moment that the user just visited are fed to a dynamic filter to limit the moments to be subsequently displayed to the user. For example, when a user opens an entertainment moment on a news feed and taps on a map depicting the location of that moment, the present system will bring the user to a map view with an embedded dynamic filter. The filter limits the displayed moments to those time range and location of the entertainment moment that is just viewed by the user.

Figure 9E:
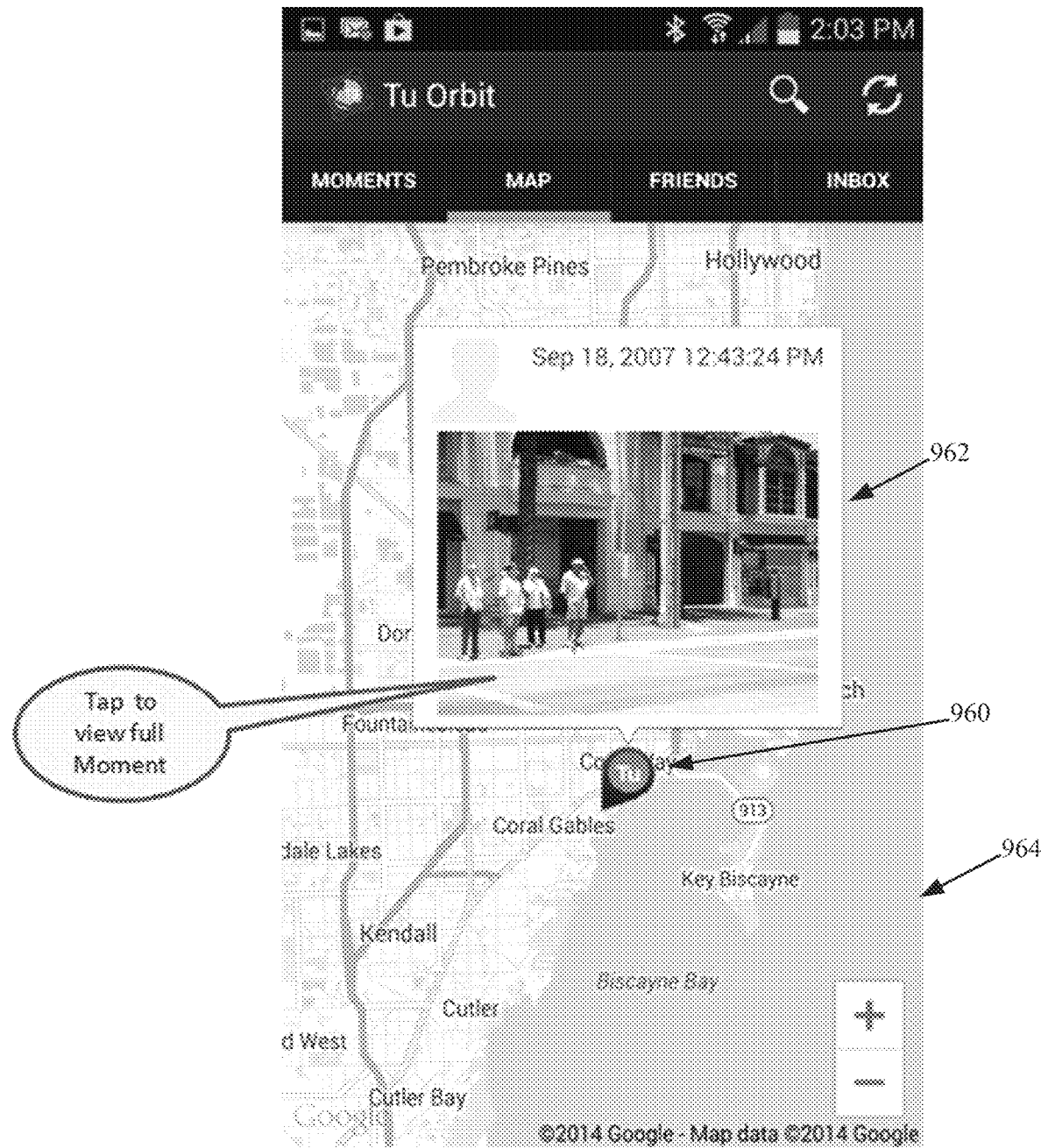
FIG. 9E illustrates a map function of moments according to an embodiment of the present application.

FIG. 9E illustrates another embodiment of searching a moment. After a moment 962 is searched, an icon 960 representing the moment is displayed on a map 964. When a user taps or clicks the icon 960, the complete information of the moment 962 is retrieved and displayed to the user. The complete information includes the content, the description, the location stamp, and the time stamp. When a user clicks or taps the moment 962, the comments and conversations of the moment 962 will be displayed.

In general, a filter/search feature of the present application has the capability of searching moments based on the following categories:

groups including personal, friend, and public (a user can search all personal moments, moments from one or more friend Groups, all public moments, or a combination of these options);

locations including address, town/city, county, state, country, and landmark;

date range;

time range;

dynamic tags which are updated based on search criteria. According to an embodiment, when all public moments during a specified period contain the following tags: "green", "yellow", "car", and "motorcycle," a user selecting all public moments within that period would have only those words as available tags for selection. According to another embodiment, the dynamic tag function updates tags displayed to a user based on both a time period and location associated with a moment selected by a user. For example, after the user selects one moment, the time and location information associated with that particular moment will be added to a dynamic filter that is used to filter and limit any subsequent search of moments. According to another embodiment, the dynamic tag function updates tags displayed to a user based on the time period associated with a moment selected by a user and the map area on a screen as defined by the user. For example, when the user enlarges or shrinks a map area on a screen, the dynamic tag function obtains the boundary information corresponding to a changed map area on the screen and updates the displayed tags based on the new boundary information and the time period information; and handle/user name—A user can select any friends handle or public handles. This is how location based micro-blogs are created within a personal orbit (friends) or public handles. A public handle is created in the following manner. When a user creates an account, the user has the choice to register as a private or public user. If the user is registered as a private user, the public will not be able to type his or her handle and will not be able to search the private user's public moments (it will only show all users' public moments). If a user is registered as a public user, the user will give all users in the system access to this public user's handle and give all other users the ability to view public moments of such a public user. A public user has one directional friend request/connection. A public user can request a connection, but all other users cannot request a friend request/connection. This is done to prevent other users from having access to moments that the user would share with its sharing groups, but not with the public.

According to an embodiment, the map view of moments is dynamically filtered to show moments on a daily or hourly basis. The filtered will update every day or hourly based on the network design dictated by the number of moments posted by all users. This keeps the map view from showing every moment created to date and cluttering the map. On a hand-held device, moments that are overlaid on top of each other can be viewed by the user by tapping on the icon several times, which will cause the moments to toggle from earliest to latest. On a tablet or computer, this issue is overcome by having a listing table next to the map. For example, if a user zooms in on the map to its home location (where presumably the user has created many moments), the user can select a time range where there will be many moments overlaid on top of each other. The user can quickly view them by scrolling through the moments on the table next to the map where they would be listed in chronological order.

In another embodiment, after a moment is created, it is posted on a news feed (chronological table format) and Geocoded onto a map, where the moment is represented by an icon on the map. These map icons are user-identified to allow the user to visually differentiate various users, as well as differentiate between user groups and the public. A user can then view/open the moment on the map by tapping or clicking on the icon. The moment creator has the ability to edit the moment, view the digital media attached to that moment, and/or exchange comments with other users (if shared) at the creator's discretion. If they are not the moment creator, a viewer can view the digital media attached to that moment, and/or exchange comments with other users at their discretion. The moments may be displayed to a user in a table alongside a map with a filter option. This creates an interactive map view between the map icons and table representation of moments alongside. Users can quickly scroll through the table format and view each moment. For example, if a user selects a moment in the table window, it coincides with a unique icon located on the map and will cause the contents of the moment to be displayed. The same process works in reverse if a user selects icon on map and it coincides with a moment on the table displayed alongside. The table view also allows a user to quickly view the type of media a moment on the map contains by placing an icon next to the moment description that depicts the media contained in that moment (i.e. text (shows text), pictures (icon of camera), video (icon of a video camera), pictures and text (text and icon of camera) . . . etc.). Additionally, as a user zoom's in or zoom's out the moments displayed on the map, the listing table is also updated accordingly. Therefore the table is automatically updated to coincide with all of the moments displayed on the map.

Figure 10:
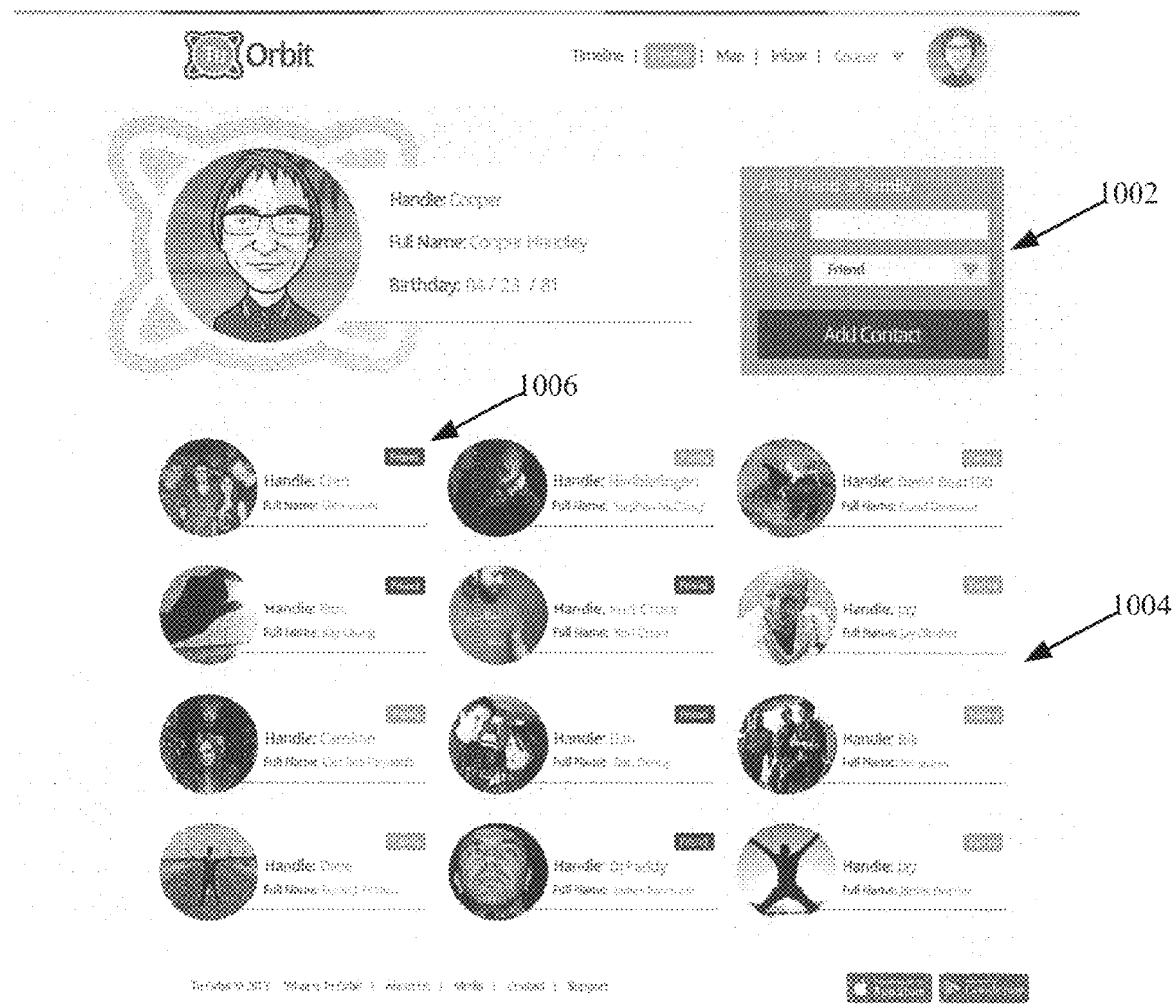
FIG. 10 illustrates a function for managing relationships with other users according to an embodiment of the present application.

FIG. 10 illustrates a function for managing personal relationships with other members. A user of the system can use both handles and designated groups to search members in a search box 1002 of the system. The searched results are displayed in an area 1004. Each contact includes a relationship button 1006 that is used to change the relationship between that contact and the user.

Figure 11:
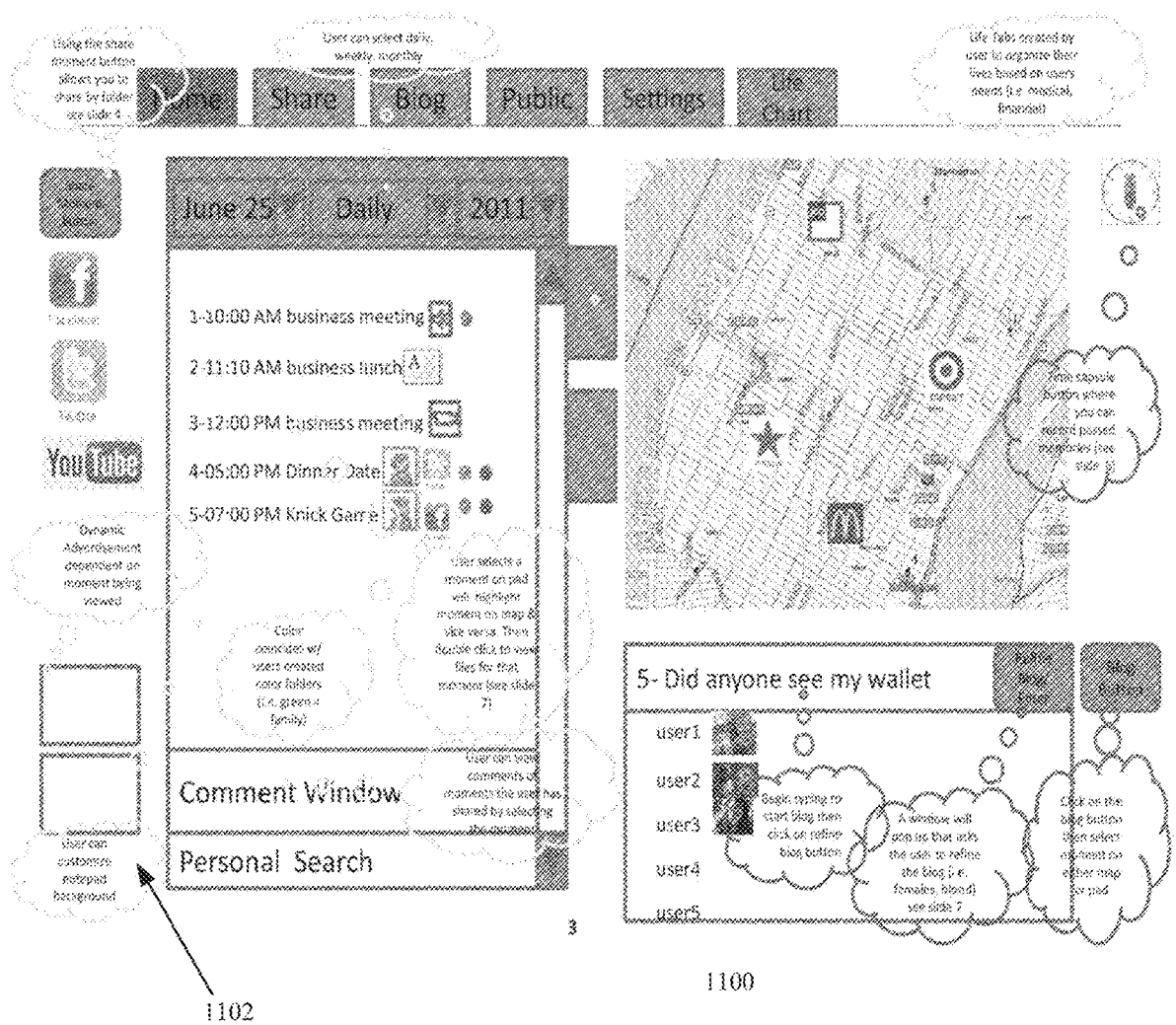
FIG. 11 illustrates a home screen according to an embodiment of the present application.

FIG. 11 illustrates a home screen according to an embodiment. The home screen 1100 may include all the functions as described in FIG. 8A. In addition, the home screen 1100 may include advertisement banners 1102 that displays dynamic advertisement based on the moments that have been viewed by the user.

Figure 12:
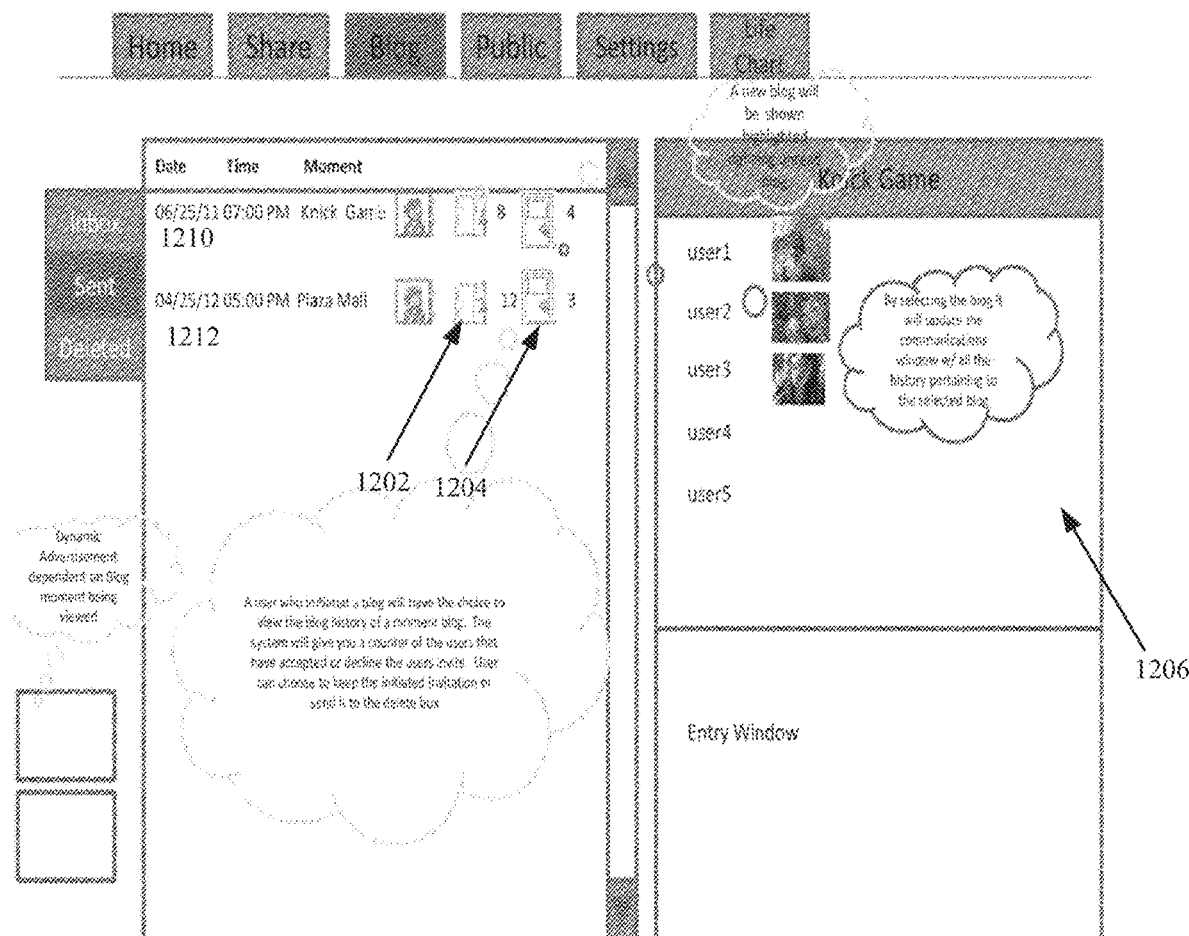
FIG. 12 illustrates a blogging function according to an embodiment of the present application.

FIG. 12 illustrates a blogging function according to an embodiment of the present application. Two moments 1210 and 1212 are created and shared by a user. The user may send invitations to a plurality of members to participate in the discussion and commenting of a moment. According to an embodiment, the system and method provide a counter 1202 indicating the number of users who have accepted the invitation and a counter 1204 indicating the number of users who have refused the invitation. When a moment is selected by a user, a commenting window 1206 is created, which displays the comments from participating users.

In one embodiment, only those users who meet both the location and time stamp of the moment can participate in the discussion. This feature allows users to connect with each other on the basis of having shared (past), will be sharing (future), or are sharing (present) location and time interval set by the user. Additionally, the user has the ability to select different characteristic criteria when using location based comment feature (i.e. male, female etc.). The user can opt out of this feature on a moment by moment basis.

According to an embodiment, for the location based discussion, the system may use at least two types of location databases. The first database includes all location information created by the user. The second database includes any other pre-existing boundary, such as a property line polygon like those shown in Zillow real property maps or Google maps. The algorithm then looks at a moment's location latitude and longitude and verifies if is located within a property line polygon. Then, each moment is indexed together with the name of the property line polygon. When the system has identified other users that fall within the same property line polygon, the system will allow the users to connect with each other at each user's discretion.

In another embodiment, the system will verify whether a conversation has been initiated. If the conversation meets the user's criteria, the systems will connect the user to that conversation. In another embodiment, the user will be able to create a polygon that falls within the property line polygon to connect with other users in a more precise manner, for example a room within a school. In another embodiment, if a user does not fall within a property line polygon, the system will use a radius allotted by the system to connect with others who fall within the radius. In another embodiment, the system presents mini-moments depicting the time location and media uploaded by user to remind the user about receiving or sending the location-based comment that the users are chatting about. In another embodiment, the system informs the user of how many other users are, have or will be sharing the same time and location to encourage the usage of location-based comments (chat).

According to an embodiment, each public moment can include commentary from all users in a manner that becomes a real time, location-based blog (i.e. crime solving using anonymous postings, tracking lost children or property by location, unfiltered anonymous content of news events (all moments related to a specific location or event such as the Boston Marathon Bombing of Apr. 5, 2013), creating a network of commuters to and from locations, sharing comments on hotels, restaurants and any other location, marketing to all users within a user-defined radius of a location and criteria chosen by the marketer and viewed by the selected users at its discretion, marketing real estate listings within a defined area, and exchanging tickets for future events at specific venues.

Figure 13:
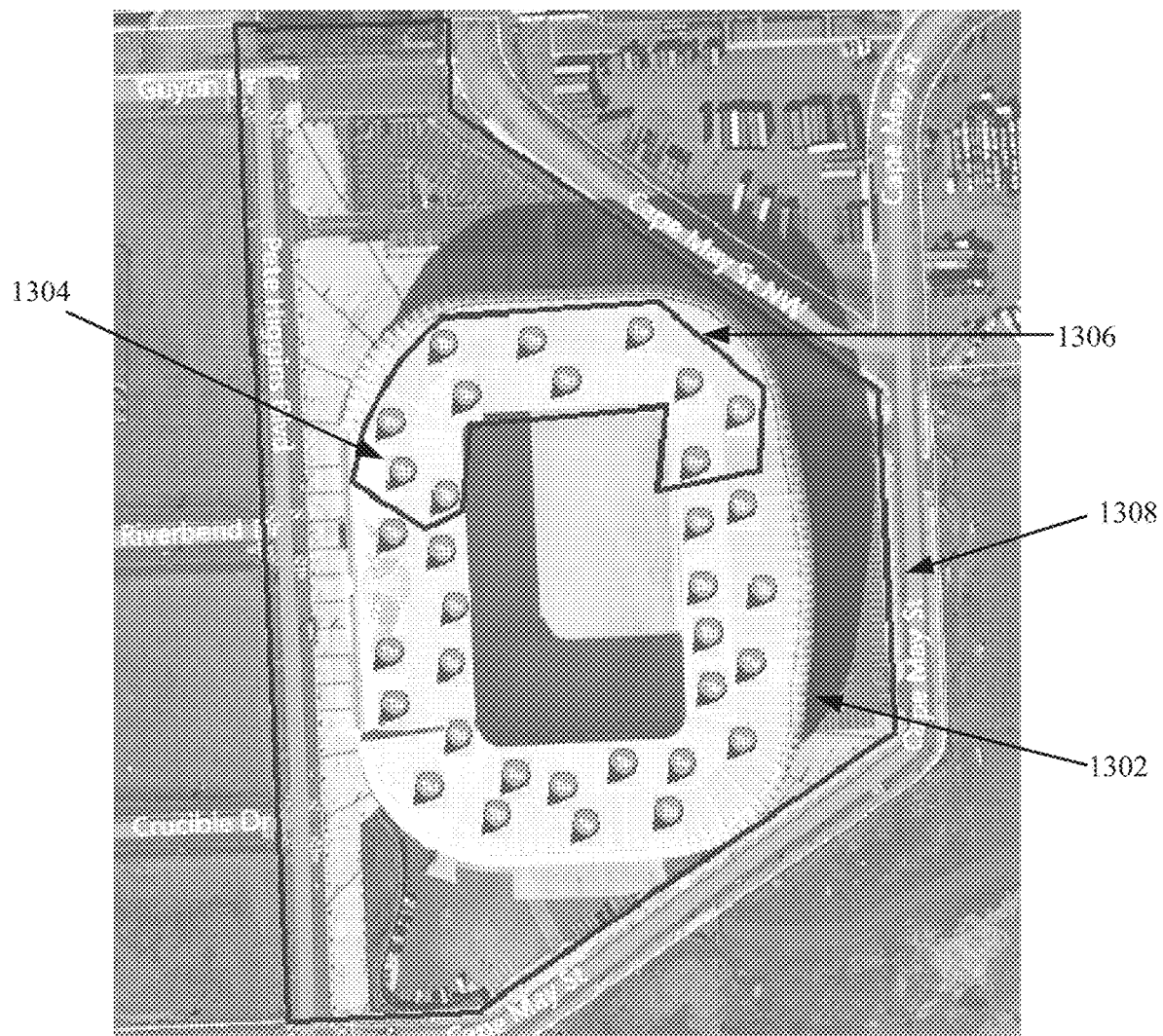
FIG. 13 illustrates a function for micro-forum based on user-defined boundaries according to an embodiment of the present application.

FIG. 13 illustrates a method and function that allow a user to interact with other users of the present social networking system based on a user-defined boundary polygon and time. As shown in FIG. 13, when a soccer game is played inside a stadium 1302, such as the Red Bull Arena in New Jersey, a user of the present system may want to discuss the game with audiences in a particular zone. The user may open a satellite view of the stadium 1302 and draw a polygon 1306 inside the stadium 1302 to define the particular zone for discussing the game. The user may create a moment 1304 inside the zone 1306 or may participate in any moment created inside the zone 1306. The present system will automatically inform the user or other users about the discussions and moments inside the defined polygon 1306. According to an embodiment, the polygon 1306 may represent a predetermined boundary, such as a property line 1308. The embodiment shown in FIG. 13 illustrates an advantage of the present system and method in setting up a group discussion or a micro-forum. The conventional method to invite a group of friends or family members to start a discussion requires a user to search contact information of those friends or family members and then invites them one by one. As shown in FIG. 13, the present system and method allow a user to start a conversation by specifying a location and a time. When a user wants to start a conversation with coworkers, he or she may simply draw a zone around his or her workplace and specify the particular time period of the day. If he or she creates a public moment, then everyone who is at that specified location and in that time period can chat with each other, regardless whether the user has their contact information or not. In this way, the process to start an online group conversation is simplified.

Protection of User's Privacy

The present system and method provide functions that protect a user's privacy. According to an embodiment, the degree of separation between a user and other members of the system may be limited to predetermined values. For example, if the separation degree is set to one, a moment is not allowed to be re-shared or re-published.

If the separation degree is set to be two, the present system allows the creator of a moment to control the precise manner that the moment may be re-shared or re-published. In one embodiment, the moment may simply be re-shared or re-published for another time without further restrictions. In another embodiment, the system allows the creator to assign specific permissions to another user. For example, the creator may allow a designated viewer of the moment to co-author the moment, such as edit the moment or supplement the moment with additional content. In another embodiment, the creator may limit a re-sharing of the moment by another user to a particular group, such as that user's friend group. These re-sharing restrictions that can be tailored by the creator of a moment provide effective privacy protections to the creator.

According to an embodiment, the handles of a user is divided into public handles and private handles. The public can only see the public handle of a user. The private handles will not be made available to the public unless the user opts to do so. The name and identity of the user may not be made available to the public unless the user chooses to use his or her name as the public handle or display his or her name. According to an embodiment, the search function provided by the present system and method is limited to search only the public handles.

Location and Time Based Micro-Forum

A user can go to the map and create a search criteria based on date and time range, handle, location, and keyword (tag) then draw a polygon around the moments of interest. Then, the user can share the polygon with its search criteria embedded in the polygon to its sharing groups. The users opening the polygon will be able to view on the map all the moments that the creator of the polygon intended everyone to view.

Applications in Various Fields

According to an embodiment, the present system and method may be used in suggesting a point of interest to a user. When a user views a moment and likes that moment, the location of that moment is recorded in a database and is associated with the user. The present system and method may monitor a user's location and remind the user when the user is within the proximity of the location of liked moments as a place the user would like to visit.

According to an embodiment, the present system and method may be used in reporting an emergency, such as a 911 reporting. A user, who happens to pass an accident, may create a moment with content, such as a textual description, a picture, a video, or a tweet, and a special tag, which may be determined by the network that automatically makes that moment public), edit the moment location to provide the most specific information, include the time if needed, and provide an immediate, but very detailed report to the 911 authorities. The user reporting the 911 incident may need to include the general location and time. A 911 responder is allowed to go to the system, view the moment on the map, assess the content, and report it to the proper authorities, such as police or EMS. The authorities being notified can simultaneously view the moment while heading toward the accident site. The authorities may tap on the address of the moment, and the system will navigate them, such as using a navigation system of their choice, to the location of the accident.

In another example, a person who is in a precarious position after experiencing a catastrophe (i.e. flash flooding, earthquake, etc.) could create and edit the moment location to provide the most specific information, including time and exact location, resulting in an immediate, but very detailed report to the 911 authorities. The user would use a special tag (i.e. 911) that will automatically alarm the relevant authorities to evaluate the location identified in the moment and to take the necessary action. The 911 authority would be able to go to the system, view the moment on the map, assess the content, stay in contact with the user(s) in trouble, and report the incident documented in the moment to the proper authorities (i.e., police, EMS) to initiate a rescue mission or other response. This method is very useful and requires minimal data bandwidth, because when digital media (i.e. pictures, audio, and video) is not attached to the moment, a moment without digital media requires no more bandwidth than a text message, but the moment can be simultaneously viewed by numerous people, providing immediate, life-saving benefits to all of them.

According to an embodiment, the present system and method may assist authorities to conduct a criminal investigation. A user may be a witness to a crime. At their discretion, they can immediately report a crime in detail with the recorded digital content, including the exact location. A user of the present system may still maintain total anonymity while making such a report. For example, the witness who observes the crime may create a moment and add media to the moment (text describing the crime, video and/or photos of the crime), edit the time and location if needed, and tag it with a special tag (to be determined by the network that automatically makes that moment public). The authorities who have already been aware of the crime location and time associated with the incident will be able to use this platform and review all moments that have been posted in the vicinity of the crime and the time interval of when the crime occurred. If the moment was tagged properly, it will make the authority's job more efficient because they would not need to review content that does not meet the tagging criteria.

According to an embodiment, the present system and method may be used in locating a lost child, such as an immediate message sent right after a child or an item is lost. A system user may communicate with all system users who share the same location and similar time and report a lost child or lost items. A user who would like to report a lost child or lost item creates a moment and can communicate by starting a location-based chat with all users in the system that created a moment at the event. The system will notify all the users who meet the location-based comment (chat) criteria with a message that will appear on their inbox. Such immediate alerts, and the ability for users to provide anonymous content that would be aggregated, would provide law enforcement and security authorities with unprecedented ability to track missing children quickly, when time is of the essence.

According to an embodiment, the present system and method allow a user to report unfiltered, anonymous content of news events. Users can create moments of news events, sports highlights, or other milestones that they have witnessed. All users can view unfiltered media of news events based on time and location. For example, the Boston Marathon bombing suspects could be tracked as people upload their content based on time and location and post it as public. Other users can easily access their data and interact with the users posting the content in an anonymously and secure environment. This is not limited to news events, but all type of events, such as natural disasters (hurricanes, earthquakes, tornadoes, and tsunamis). The interactive map allows users to quickly and efficiently navigate through an unlimited number of moments at a specific location. Users can more accurately look for content based on a specific event from the past present of future (football game, concert etc.) and interact with all in the past, present, and future.

According to an embodiment, the system and method may be used as a platform to exchange/sell tickets for future events. It can be used as a platform to exchange/sell tickets for future events. As people create moments of events in the future, they can interact with all users attending the same event and exchange tickets or request for tickets to that event in a secure environment. The platform can accommodate this interaction by setting up a payment system, and/or collaborate with existing ticketing platforms.

According to an embodiment, the present system and method allow restaurant/hotel owners to easily interact with their patrons. Restaurants/hotel owners can communicate with their patrons via this platform. As users create moments in their restaurants/hotels, this platform allows users to communicate with all whom where within their confinements who have created a moment in their establishment. This platform allows all users to connect based on location. This feature is not limited to just restaurants or hotels, but any entities that would like to maintain communication with their patrons. Schools can use it to stay connected with their students after they have graduated. The system makes it easier to communicate because no e-mail addresses, telephone numbers, personal/business addresses, names are exchange or needed to communicate.

According to an embodiment, the present system and method may also provide assistance in real estate transactions. Realtors can create location-based content. Although several realty systems/platforms have been designed to work system wide for the realty company (i.e. Remax, Century 21 etc.), there are no systems currently on the market that caters to the individual realtor. This platform allows the individual realtor to advertise, to its network of buyers, the properties the realtor is most interest in showing/selling in a particular location and easily keep and search personal notes based on location, including whom has visited this property, and upload digital media for all prospective buyers to easily view. A realtor can display its properties by location and create keywords (i.e. 1, 2, and 3 bed-room units) for all the realtor's customers to quickly and efficiently view on a map with the location and the digital media related to a particular property. The prospective buyers will be able to input the realtor's handle and view all posting related to a keyword they are interested in viewing and interact with the realtor showing them.

According to an embodiment, the present system and method help public workers to timely maintain public roads.

For example, the system and method may be used to report potholes and other issues to a Municipality. The public can assist local governments by reporting the location, time, date and digital media (at public user's discretion) of a pothole that needs fixing by the city. Also, the city can determine the priority of the potholes that need fixing by determining the density (number of reporting) that a particular pothole may get. The city would advertise the name of the tag (i.e. "NYC potholes" to report the potholes on the present system.) The system would consider this tag exclusive to NYC and automatically make this moment public (this feature can be easily added on the back end of the system, attaching a sharing group to a particular tag). The user's would open the App to create a moment in the location of the pothole or if they choose to create it at a later time and edit the location to represent the pothole location, upload pictures or video (at user's discretion) and tag it. This would be the end of the public's involvement. The city/municipality or public would be able to login into the system, go onto the map view, and display the moments based on the tag, location, date and time range. Additionally, the city/municipality could communicate with the public by letting them know when it's going to be fixed or updating them that it has been fixed. This is not limited to just potholes but to any type of reporting that requires other user's assistance. One can look at this method as requiring multi user collaboration for one user to view on a map.

According to an embodiment, the present system and method help Mass Transit to manage schedules and the location of Bus Stops. The bus company (i.e. N.J. Transit) would create an account with a Public handle. Once they create the account they can create moments for each bust stop and precise location (system's ability to edit location). Additionally, the bus company would create each moment with the tag of the bus number or numbers if multiple buses have the same stop (i.e. #165, #135 etc.). A bus stop for multiple buses would require multiple tags. The company can upload a document displaying the bus number with the time/day schedule for that particular bus stop and multiple documents if the stop is for multiple buses. Also, the bus company can maintain the public in real time of any issues or delays at a particular bus stop. The users needing to find a bus stop for a particular bus would login to the system type in the handle for the bus company (i.e. "N.J. Transit") and select the tag (i.e. "#165") of the bus the user is interested in viewing. The map would display on the map the bus stop locations for bus number 165 and a point on the map displaying the user's location, so that the user can see their distance relative to the bus stops. The user would select the moment (bus stop) that they are interested in and the moment would open displaying the date and time schedule for that particular bus. One can look at this method as the collaboration of one user for multiple users to view on a map.

According to an embodiment, the present system and method alert public in time about a Public Safety (OSHA's evacuation routes). For example, the Occupational Safety and Health Administration could create an account with a Public Handle in the present system and use moments to transmit information in real-time that would be viewed on the mobile devices of those who are impacted. Once OSHA creates the account, it can create a polygon depicting an evacuation route for a particular city and save it as a moment. This process could be replicated for all cities throughout the country. Additionally, OSHA could create moments that could be inserted along the evacuation route in real-time during an evacuation in order to stay connected with the population that is being evacuated. The users needing to evacuate from a particular city would login to the system type in the handle for OSHA and select the applicable tag (i.e.: New Orleans). The system would display the evacuation route along with moments on a map where users can interact with OSHA in real-time, resulting in unprecedented interaction and collaboration.

In one embodiment, the present system may provide a personal planner for a user. A user can create both current and future moments that correspond to activities to be attended by the user. Then, on a particular day, the user can open a map view that displays both private and public moments and view all other moments surrounding his or her own moments. With both location and time information associated with those moments, a user can quickly realize any interactions between his or her moments and all other moments.

In one embodiment, the present system may assist a user to upload and organize media contents, such as pictures and videos, based on moments. When a user has taken hundreds of pictures during a long period of time, it is cumbersome and time consuming to upload those pictures and organize them in a manner that is easy to search and identify. According to an embodiment, a user may create a moment that has a particular time a location information. When the user uploads a piece of digital content, the present system can detect the time and location information associated with that piece of digital content based on the meta data of that digital content. The present system further designates the piece of digital content to one or several moments based on a match of those time and location information. For example, when a user plans a vacation in Mexico, the user can create a moment corresponding to the time and place of his or her vacation. The user can take all the pictures using an electronic device while in Mexico and would not upload those pictures because of the cost of data communication. When the user comes back to the United States, the user can log on to the present system and upload the picture by using an upload function. The present system will automatically detect the time and location of those pictures based on the meta data, display those pictures around that moment on a map view, and save those pictures to a folder designated to that moment previously created by the user before the vacation. The present system may further detect the content in those pictures based on any available algorithms such as face identification algorithms and make a more refined categorization of those pictures.

According to an embodiment, the present system and method may be used to discover connections among users of the system for dating, friendship, business, or other purposes. As the present system and method store all moments created by the users in a database, a search may be performed within the database to identify all moments that have shared similar location and time period. The present system and method may retrieve the user information associated with those identified moments and notify such users that there is another user that has connections with them. Such notification may use an anonymous name for a user and may not disclose the identity of a user. Such embodiments may be used for past moments, present moments, or future moments. When the user prefers to socialize with other users who have shared, are sharing, or will share the specified location, date, and time period, the user may log onto the social network to start a connection with other users or to make variations of the search algorithm to expand or narrow the search results. The present system and method may set a predetermined time window to limit the time period during which a user can make such variations. The search criteria may include sex, age range, and other personal traits. Such functionality allows users to interact with users of the same or opposite sex in a manner that can lead to a dating, friendship and/or business relationship. In addition, the creation of new relationships based on moments allows the platform to connect and/or reconnect them in the past, present, and future.

Advertisement

The present system and method also include a plurality of functions for advertisement and sponsorships. According to an embodiment, the moment Line and news feeds may have dedicated areas for advertisement. Sponsor advertisement may pop up on Map Views or be linked to public moments that are location-based and user relevant (i.e. user who is of drinking age and is viewing public moments at Yankee Stadium would see the public moment sponsored by Budweiser). A tag may be leased out as name brand tags (i.e. Coca Cola could have exclusive rights to the tag). Location-based sponsor tags (i.e. Mass Transit, Municipal and other sponsorships of transit schedules, traffic alerts, pothole repairs, etc.) may be used. According to an embodiment, location-based target marketing may be tied into the platform (i.e. Business would login into the platform for marketing purposes and create a micro marketing campaign (product at a discount) designed for users with a specific taste, time range, and within a location radius). Businesses can also connect with all their patrons who have visited their establishment, provide targeted updates and offers.

Certain Advantages and Benefits Provided by the Present System and Method

The present social networking system represents a dynamic data-mapping platform that is suitable for managing dynamic or static data/moments that may or may not require collaboration from the public, and are viewable on a map. The location information of a moment provides critical context for the application of a moment. For example, the need for the public to report pot-holes that require fixing for a city/municipality and the city/municipality to have a use-friendly mapping system to display/monitor what is being reported by the public. The present system provides the ability for many users to collaborate for the benefit of a particular user or users to view. When a user needs to find a bus stop, the bus number, destination, and arrival times near his current location in an easy to view on a map, the present system and method provide the ability for a user or users to collaborate on moments for many users to view.

The phrase "an embodiment" as used herein does not necessarily refer to the same embodiment, though it may. In addition, the meaning of "a," "an," and "the" comprise plural references; thus, for example, "an embodiment" is not limited to a single embodiment but refers to one or more embodiments. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method of creating and sharing on-line comments of a point of interest, the method comprising:
creating, by a first user, a moment having at least one piece of digital content showing the point of interest on a display screen of a computing device, wherein the moment has a time stamp and a location stamp;
defining a geographic location corresponding to the location stamp;
defining a bounded time period corresponding to the time stamp;
identifying a first group of users located within the geographic location;
sharing the moment with said first group of users;
wherein the sharing of the moment comprises:
displaying a map with an icon representing the location stamp, and
displaying the at least one piece of digital content concurrently with the map; and
displaying on a map area of the map at least one additional shared moment corresponding to the time stamp of the moment on the display screen;
displaying a list of dynamic tags corresponding to the moment on the display screen, wherein the list of dynamic tags is updated based on the time stamp associated with the moment and a boundary information obtained when the first user enlarges or shrinks the map area to change the map area on the display screen;
providing a chat interface, wherein the chat interface is not provided to users located outside the geographic location during the bounded time period and wherein the chat interface is associated with the moment and not the at least one piece of digital content;
recording a location stamp of a moment that is liked by the first user;
reminding the first user about a place associated with the recorded location stamp when the first user is within the proximity of the place; and
assigning an attribute that controls whether the first group of users are allowed to re-share the created moment with a second group of user.

2. The method of claim 1, wherein the geographic location corresponding to the location stamp of the created moment is defined by a property line boundary.

3. The method of claim 1, wherein the geographic location corresponding to the location stamp of the created moment is defined by a user-drawn polygon on the map.

4. The method of claim 1, wherein the geographic location corresponding to the location stamp of the created moment is defined by a structure perimeter.

5. The method of claim 1, wherein the location stamp of the created moment is created based on OPS data of the computing device that creates the moment or is user defined.

6. The method of claim 1, further comprising notifying the first user of how many other users are located within the geographic location.

7. The method of claim 1, further comprising notifying the first user of at least one other moment created by another user within the geographic location.

8. The method of claim 1, wherein the sharing of the created moment is limited to users at the geographic location during the bounded time period, and wherein the method prevents sharing of the moment to users at the geographic location outside the bounded time period.

9. The method of claim 1, wherein the at least one piece of digital content includes metadata indicating a time and location the at least one piece of digital content was created, and wherein the time stamp and the location stamp of the created moment are based upon the metadata.

10. The method of claim 1, wherein the created moment further comprises a plurality of pieces of digital content, each piece of digital content having metadata indicating a time and location the digital content was created, and wherein the time stamp and the location stamp are based upon the metadata of the plurality of pieces of digital content.

11. The method of claim 1, further comprising:

creating a plurality of pieces of digital content, each piece of digital content having metadata indicating a time and location the digital content was created;

detecting the time and location of creation of each of the plurality of pieces of digital content;

determining which of the plurality of pieces of digital content have a time and location that corresponds to the time stamp and the location stamp of the moment; and assigning the plurality of pieces of digital content to the created moment that have a time and a location that corresponds to the time stamp and the location stamp of the created moment.

12. The method of claim 1, further comprising:

notifying at least one user located within the geographic location of the created moment.

13. The method of claim 12, wherein the notifying includes displaying on the display screen a map with at least one icon that represents the created moment.

14. The method of claim 1, the method further comprising editing the created moment, wherein the editing comprises:
 modifying the time stamp;
 modifying the location stamp;
 altering or changing the at least one piece of digital content; or
 combinations thereof.

15. The method of claim 1, wherein the time stamp represents a past time period or a future time period.

16. A non-transitory recording medium storing an executable program which, when executed, causes a processor on a computing device to execute a method for creating on-line comments of a point of interests, the method comprising:

creating, by a first user, a moment having at least one piece of digital content showing the point of interest on a display screen of a computing device, wherein the moment has a time stamp and a location stamp;

defining a geographic location corresponding to the location stamp;

defining a bounded time period corresponding to the time stamp;

identifying a first group of users located within the geographic location;

sharing the moment with said first group of users;

wherein the sharing of the moment comprises:
 displaying a map with an icon representing the location stamp, and
 displaying the at least one piece of digital content concurrently with the map; and displaying on a map area of the map at least one additional shared moment corresponding to the time stamp of the moment on the display screen;

displaying a list of dynamic tags corresponding to the moment on the display screen, wherein the list of dynamic tags is updated based on the time stamp associated with the moment and a boundary information obtained when the first user enlarges or shrinks the map area to change the map area on the display screen;

providing a chat interface, wherein the chat interface is not provided to users located outside the geographic location during the bounded time period and wherein the chat interface is associated with the moment and not the at least one piece of digital content;

recording a location stamp of a moment that is liked by the first user;

reminding the first user about a place associated with the recorded location stamp when the first user is within the proximity of the place; and assigning an attribute that controls whether the first group of users are allowed to re-share the created moment with a second group of user.

* * * * *